(12) United States Patent
Douglis et al.

(10) Patent No.: US 9,389,965 B1
(45) Date of Patent: Jul. 12, 2016

(54) SYSTEM AND METHOD FOR IMPROVING PERFORMANCE OF BACKUP STORAGE SYSTEM WITH FUTURE ACCESS PREDICTION

(75) Inventors: Frederick Douglis, Basking Ridge, NJ (US); Windsor W. Hsu, San Jose, CA (US); Hangwei Qian, Cleveland, OH (US)

(73) Assignee: EMC Corporation, Hopkinton, MA (US)

( * ) Notice: Subject to any disclaimer, the term of this patent is extended or adjusted under 35 U.S.C. 154(b) by 928 days.

(21) Appl. No.: 13/460,728

(22) Filed: Apr. 30, 2012

Related U.S. Application Data

(60) Provisional application No. 61/609,578, filed on Mar. 12, 2012.

(51) Int. Cl.
*G06F 12/02* (2006.01)
*G06F 11/14* (2006.01)

(52) U.S. Cl.
CPC .................................. *G06F 11/1453* (2013.01)

(58) Field of Classification Search
None
See application file for complete search history.

(56) References Cited

U.S. PATENT DOCUMENTS

| | | | |
|---|---|---|---|
| 6,996,678 B1 | 2/2006 | Sharma | |
| 7,240,143 B1 | 7/2007 | Scheffler et al. | |
| 8,108,446 B1 * | 1/2012 | Christiaens | 707/816 |
| 8,468,320 B1 | 6/2013 | Stringham | |
| 8,495,392 B1 * | 7/2013 | Bardale | 713/193 |
| 8,667,273 B1 * | 3/2014 | Billstrom et al. | 713/165 |
| 8,831,003 B2 | 9/2014 | Guo et al. | |
| 2005/0044331 A1 | 2/2005 | Simms | |
| 2009/0125753 A1 | 5/2009 | Kryka | |
| 2010/0235579 A1 | 9/2010 | Biles et al. | |
| 2011/0082840 A1 * | 4/2011 | Jayaraman | 707/692 |
| 2011/0119426 A1 | 5/2011 | Boyle et al. | |
| 2011/0276744 A1 | 11/2011 | Sengupta et al. | |
| 2011/0307447 A1 | 12/2011 | Sabaa et al. | |
| 2011/0307664 A1 | 12/2011 | Paver et al. | |
| 2012/0221802 A1 | 8/2012 | Huang | |
| 2013/0036277 A1 | 2/2013 | Szczepkowski et al. | |
| 2013/0117497 A1 | 5/2013 | Cui et al. | |
| 2013/0132509 A1 * | 5/2013 | Styles | 709/217 |
| 2013/0173853 A1 | 7/2013 | Ungureanu et al. | |
| 2013/0326154 A1 | 12/2013 | Haswell | |
| 2013/0326156 A1 | 12/2013 | Cui et al. | |

OTHER PUBLICATIONS

Non-Final Office Action, U.S. Appl. No. 13/460,711, dated May 7, 2014, 10 pages.
Non-Final Office Action, U.S. Appl. No. 13/601,885, dated Jun. 30, 2014, 53 pages.
Non-Final Office Action, U.S. Appl. No. 13/460,722, dated Jul. 30, 2014, 12 pages.
Non-Final Office Action, U.S. Appl. No. 13/601,885, dated Dec. 2, 2014, 26 pages.

(Continued)

*Primary Examiner* — Charles Rones
*Assistant Examiner* — Ryan Dare
(74) *Attorney, Agent, or Firm* — Blakely, Sokoloff, Taylor & Zafman LLP

(57) ABSTRACT

A request is received to read a portion of a file from the storage system. In response to the request, future requests to the file are predicted based in part on the received request and metadata of the file. Access of a subsequent portion of the file is optimized based on the predicted future requests and the data contained in the portion of the file is then returned.

24 Claims, 17 Drawing Sheets

(56) References Cited

OTHER PUBLICATIONS

Final Office Action, U.S. Appl. No. 13/460,722, dated Jan. 29, 2015, 10 pages.

Belady, L. A., "A study of replacement algorithms for a virtual-storage computer," IBM Systems Journal, vol. 5, No. 2, 1966, pp. 78-101.

Bloom, Burton H., "Space/Time Trade-offs in Hash Coding with Allowable Errors," Communications of the ACM, vol. 13, No. 7, Jul. 1970, pp. 422-426.

Cao, Pei et al., "A Study of Integrated Prefetching and Caching Strategies," In Proceedings of the 1995 ACM SIGMETRICS joint international conference on Measurement and modeling of computer systems (1995), pp. 188-197.

Lillibridge, Mark et al., "Sparse Indexing: Large Scale, Inline Deduplication Using Sampling and Locality," USENIX Association, $7^{th}$ USENIX Conference on File and Storage Technologies (Fast '09), San Francisco, California, USA Feb. 24-27, 2009, pp. 111-123.

Nam, Youngjin et al., "Chunk Fragmentation Level: An Effective Indicator for Rad Performance Degradation in Deduplication Storage," IEEE International Symposium of Advances on High Performance Computing and Networking (HPCC/AHPCN), Sep. 2011, 6 pages.

Patterson, R. Hugo et al., "Informed Prefetching and Caching," Proceedings of the $15^{th}$ ACM Symposium on Operating System Principles, Copper Mountain Resort, Colorado, USA, Dec. 3-6, 1995, pp. 79-95.

Quinlan, Sean et al., "Venti: a new approach to archival storage," USENIX Association, Proceedings of the FAST 2002 Conference on File and Storage Technologies, Monterey, California, USA, 14 pages.

Tan, Yujuan et al., "SORT: A Similarity-Ownership Based Routing Scheme to Improve Data Read Performance for Deduplication Clusters," International Journal of Advancements in Computing Technology (IJACT), vol. 3, No. 9, Oct. 2011, pp. 270-277.

Wallace, Grant et al., "Characteristics of Backup Workloads in Production Systems," Proceedings of the 10th USENIX Conference on File and Storage Technologies (FAST 2012), San Jose, CA, Feb. 2012, 16 pages.

Zhu, Benjamin et al., "Avoiding the Disk Bottleneck in the Data Domain Deduplication File System," USENIX Association, FAST '08, $6^{th}$ USENIX Conference on File and Storage Technologies, San Jose, California, USA, Feb. 26-29, 2008, pp. 269-282.

* cited by examiner

250

```
┌─────────────────────┐     ┌─────────────────────┐     ┌─────────────────────┐     ┌─────────────────────┐
│ Receive a request   │     │ Retrieve and service│     │ Predict whether any │     │ Improve access      │
│ for accessing a file│     │ the request using a │     │ of the data objects │     │ performance (e.g.,  │
│ (e.g., backup file) │     │ first portion of the│     │ in the first portion│     │ scheduling,         │
│ from a storage      │ ──▶ │ data objects of the │ ──▶ │ will likely be      │ ──▶ │ prefetching, and/or │
│ system, the file    │     │ file.               │     │ subsequently        │     │ caching) of the data│
│ being represented by│     │ 252                 │     │ accessed in a second│     │ objects subsequently│
│ data objects (e.g., │     │                     │     │ portion of the file.│     │ accessed during     │
│ deduplicated data   │     │                     │     │ 253                 │     │ accessing the second│
│ chunks, compression │     │                     │     │                     │     │ portion of the file │
│ region(s),          │     │                     │     │                     │     │ based on the        │
│ container(s)).      │     │                     │     │                     │     │ prediction.         │
│ 251                 │     │                     │     │                     │     │ 254                 │
└─────────────────────┘     └─────────────────────┘     └─────────────────────┘     └─────────────────────┘
```

FIG. 2B

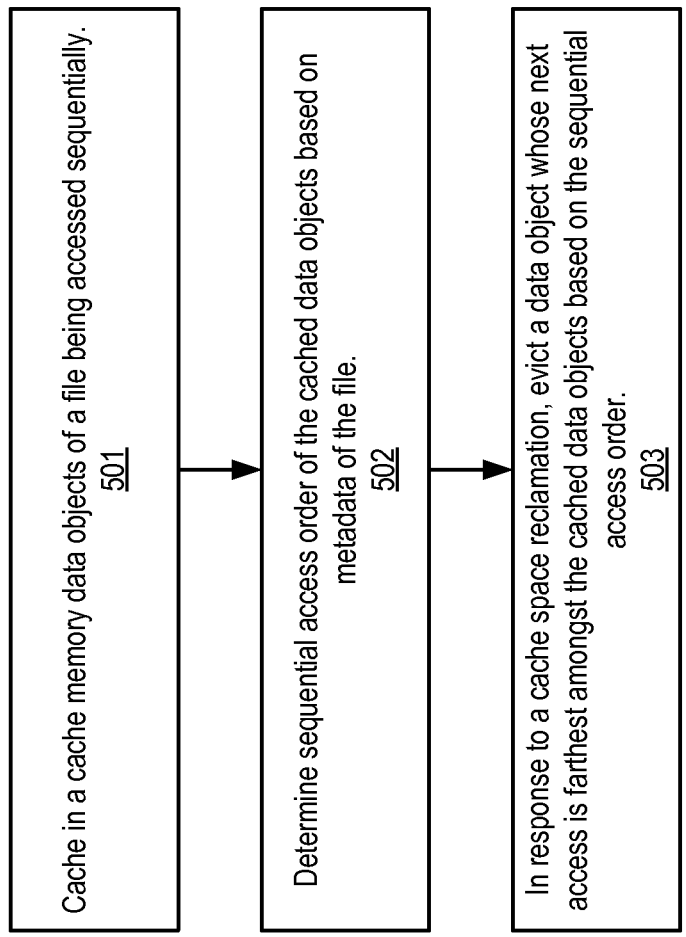

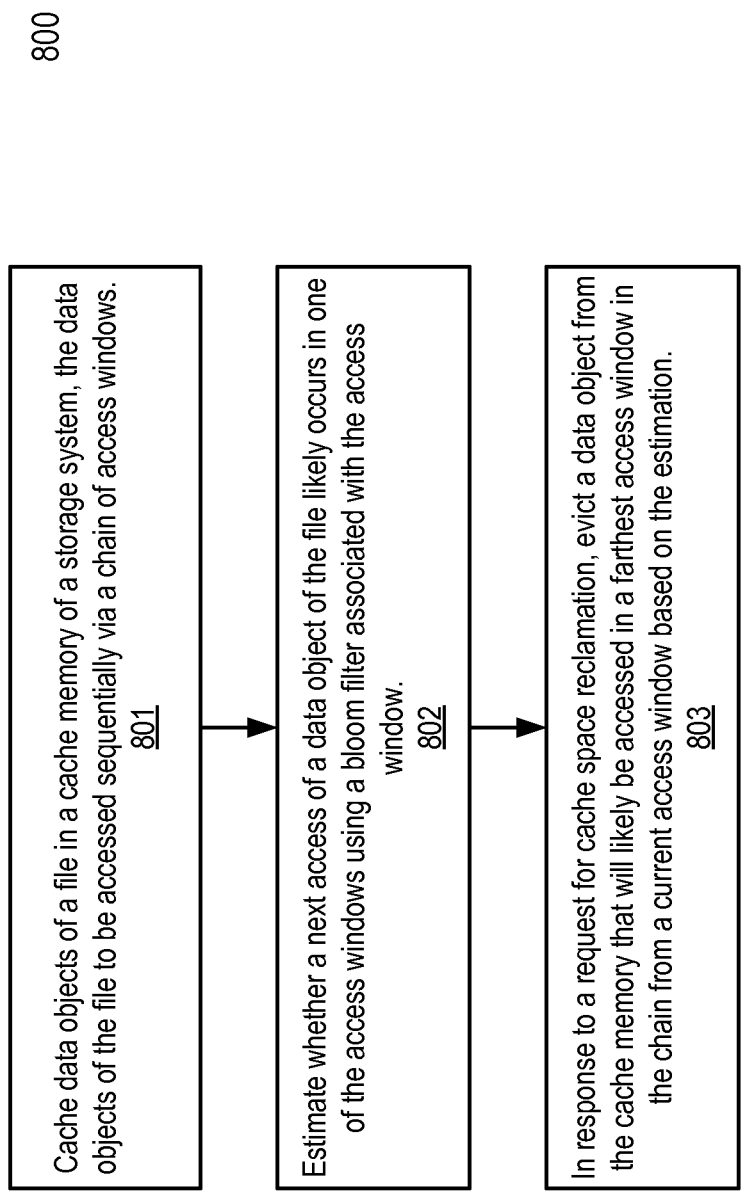

SYSTEM AND METHOD FOR IMPROVING PERFORMANCE OF BACKUP STORAGE SYSTEM WITH FUTURE ACCESS PREDICTION

RELATED APPLICATIONS

This application claims the benefit of U.S. Provisional Patent Application No. 61/609,578, filed Mar. 12, 2012. This application is also related to co-pending U.S. patent application Ser. No. 13/460,711, entitled "System and Method for Cache Replacement using Access-ordering Lookahead Approach," filed Apr. 30, 2012, and co-pending U.S. patent application Ser. No. 13/460,722, entitled "System and Method for Cache Replacement using Bloom Filter Lookahead Approach," filed Apr. 30, 2012. The disclosure of the above applications is incorporated by reference herein in its entirety.

FIELD OF THE INVENTION

Embodiments of the present invention relate generally to data storage systems. More particularly, embodiments of the invention relate to improving performance of a backup storage system based on future access prediction.

BACKGROUND

The performance of a computer system largely depends on the performance of its slowest component. For example, retrieving data from a non-volatile storage device, such as one or more hard disk drives, to a high-speed memory, is limited by the speed of the disk drives. Various techniques are used to improve performance. One such technique is known as "caching," in which data retrieved from disk are retained in the high-speed memory in order to improve the access time for that data on subsequent accesses. Another technique is known as "prefetching," in which data are retrieved from disk in advance of an explicit request for the data, in order to have the data available in high-speed memory at the time the request is made. Still another technique is the reordering of input from and output to the disk, when feasible. For example, a disk with a queue of several blocks to write might reorder the write operations to minimize the latency of repositioning a disk head between writes.

During a sequential read operation, an application program, such as a restore program, will process numerous data records stored at contiguous locations in the storage device. It is desirable during such sequential read operations to prefetch the sequential data into cache in anticipation of the requests from the application program. A sequential caching algorithm detects when a device is requesting data as part of a sequential access operation. Upon making such detection, the storage controller or server may begin prefetching sequential data records following the last requested data record into a cache in anticipation of future sequential accesses. The cached records may then be returned to the application performing the sequential data operations at speeds substantially faster than retrieving the records from a non-volatile storage device.

The field of deduplicating storage systems adds a layer of complexity to the problem of improving read performance. In a deduplicating storage system, unique pieces of data known as "chunks" are identified via hashes known as "fingerprints." To read back a file, the system loads a list of fingerprints for the file, and then reads the chunks corresponding to the fingerprints. One method for finding the chunks on disk is to have an index that associates a fingerprint with a container, which is an aggregate of many chunks. These chunks can be concatenated together and compressed to save disk space beyond the benefits that deduplication provides. Once identifying the correct container, the file system can load the metadata for the container, which lists all the fingerprints of the chunks stored in the container, along with their locations. To read a particular chunk, the system reads a read unit (RU) such as a compression region (CR) containing the chunk desired. At this point other chunks in that RU are also loaded into memory, because the RU is the unit of an input/output (TO) operation when reading from the disk. In contrast, when writing to the disk, a full container is written in one IO operation.

Once read into memory, the RU can be retained in a cache to improve the performance of later accesses to chunks in the RU. The system reserves some amount of memory as a cache for RUs, and whenever a new one is loaded into memory, another RU must be removed from the cache when the cache space is insufficient. A typical paradigm is to cache data in a "least recently used" (LRU) fashion, using past accesses as a prediction of future behavior. Often such a prediction is inaccurate and unreliable, particularly, for a backup storage system. LRU works well on data with good locality (e.g., stored in nearby locations); it does not work as well with fragmented storage locations such as would be found in a deduplicated storage system. In a backup storage system, especially a deduplication backup storage, files are chunked and chunks are stored across multiple different storage locations or containers. Further, after the incremental backup and/or garbage collection, the chunks of the files are dispersed within the storage system and the locality tends to worsen.

When reading back a deduplicated file, two things are different from "traditional" file systems that have used LRU caching effectively for many decades. Firstly, deduplicated data can be fragmented among many different places on a disk. In a standard file system, when writing a file, the entire file is typically written contiguously in the file system, and a single large read is sufficient to provide the file to a reader. In a deduplicating system, a file may consist of references to many different containers because versions of the file have been created over time. Secondly, restoring backup data may result in an extremely large read request, which provides information in advance about all the fingerprints that will be needed over an extended period of input/output (IO) transactions. The quantity of "look-ahead" information available may be substantially greater than in a traditional system. Given this information, one way to use advance knowledge of the IOs that will be required is to prefetch data: bring data from disk into memory before the point where the data will actually be needed. But due to the fragmentation caused by deduplication, simply retrieving the next data that will be accessed that is not already cached does not take full advantage of the access information.

BRIEF DESCRIPTION OF THE DRAWINGS

Embodiments of the invention are illustrated by way of example and not limitation in the figures of the accompanying drawings in which like references indicate similar elements.

FIG. 2B is a flow diagram illustrating a method for efficiently providing file services in a storage system according to one embodiment of the invention.

FIG. 5 is a flow diagram illustrating a method for accessing data objects according to one embodiment of the invention.

FIG. 8 is a flow diagram illustrating a method for accessing data objects according to another embodiment of the invention.

DETAILED DESCRIPTION

Figure 1:
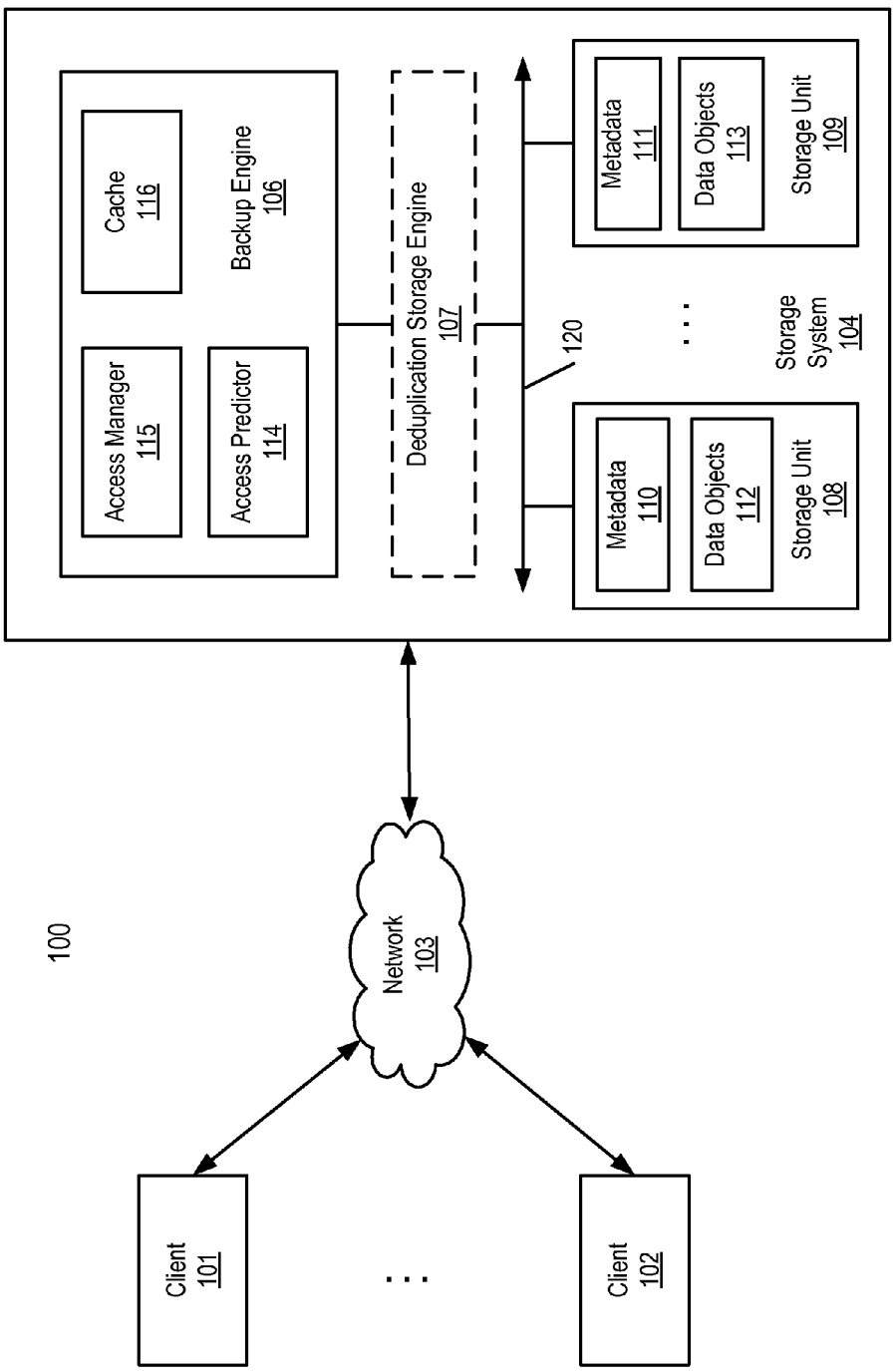
FIG. 1 is a block diagram illustrating a storage system according to one embodiment of the invention.

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

According to some embodiments, when a file such as a backup file is retrieved and accessed from a backup storage system, a prediction is performed based on metadata (e.g., fingerprints) of chunks of the file to predict whether a chunk occurred at a first portion or location of the file will be subsequently accessed again at a second portion or location of the file. Based on the prediction, certain actions may be performed to improve subsequent access of the chunk, for example, with better prefetching, caching, and/or scheduling. For example, a chunk that is likely to be accessed again subsequently within the same file may be prefetched and/or cached in a cache memory prior to the actual access of the chunk, such that subsequent access of the same chunk later on can be improved. Alternatively, based on the metadata, a related file (e.g., incremental backup file) may be identified and certain actions may also be performed on the related file to improve subsequent access of the related file.

In addition, an efficient cache replacement (also referred to as cache eviction) scheme is employed based on the prediction to further improve data access performance. In one embodiment, the system evicts a data object from the cache that would likely be accessed within the same file farthest in the future based on the prediction. That is, a data object that will not likely be accessed again or for a while within the same file is considered as a top candidate for eviction. A data object may represent a chunk of a file. In a deduplicating storage system, such as a Data Domain deduplication storage system, a data object may represent a data chunk, a CR containing one or more data chunks, a container containing one or more CRs, or a combination thereof. Such an efficient eviction scheme can be implemented using various lookahead prediction methods.

In one embodiment, the system looks ahead and parses metadata (e.g., fingerprints) of data objects within an access window (also referred to as a lookahead window) that covers a certain amount of chunks of the file to be accessed, where the access window is a sliding access window to read a certain amount of metadata of chunks of a file into the memory at a time (since the file may be a backup file with a large size). The logical access order (also referred to as logical time stamps or access sequence numbers) of the chunks within the access window is obtained and retained in the memory based on the associated metadata. When a data object is accessed and stored in a cache, the next access sequence order of the data object is recorded in a data structure, such as a max heap data structure, as an eviction candidate data structure. The data structure is to maintain a reference of a data object with largest or latest next access order with respect to a current access order or time (e.g., farthest from the current access point). During a cache eviction process, a data object from the cache eviction candidate data structure with the largest access order will be identified from the data structure and evicted from the cache. When a certain amount (e.g., a predetermined threshold) of metadata of data objects of the current window has been processed, the process will slide onto a next access window (e.g., sliding the window to subsequent data objects in the file). This approach is referred to as an access-ordering lookahead approach.

According to another embodiment, to reduce memory usage, an access window is divided into multiple sub-windows (SWs) in a chain. The system looks ahead at the metadata of data objects in multiple sub-windows. When a data object is accessed at a current sub-window, an estimate is performed to approximately predict whether and when the next time the data object will likely be accessed during a subsequent sub-window. If it is determined that the data object is unlikely to be accessed in any of the subsequent sub-windows, the data object is indicated in a garbage list. The system walks through the sub-windows in an ascending or forward order, from the nearest sub-window to the farthest sub-window with respect to the current or active sub-window (e.g., the first overall sub-window amongst them). The information concerning whether and when the next time a particular data object is likely to be accessed in a subsequent sub-window is maintained. In one embodiment, metadata such as the fingerprint of the data object is input into a bloom filter of each sub-window. The output of the bloom filter is utilized to indicate whether the data object is likely to be accessed in the corresponding sub-window. This approach is referred to as a bloom filter lookahead approach. In one embodiment, each sub-window is associated with a bloom filter, which may be created dynamically or statically.

In one embodiment, during the cache space reclamation process, the system first examines the garbage list to identify any data object listed therein (e.g., data objects that are not referenced across all the sub-windows) and to evict at least one data object from the garbage list. If more cache space is needed and if there is no data object listed in the garbage list, the system walks through the sub-windows in a descending or backward order, from the farthest sub-window to the nearest sub-window with respect to a current sub-window, until the enough cache space has been reclaimed. If none of the sub-windows other than the current sub-window includes any data object for eviction, according to one embodiment, the access-ordering lookahead approach is utilized to handle the cache eviction process within the current sub-window.

FIG. 1 is a block diagram illustrating a storage system according to one embodiment of the invention. Referring to FIG. 1, system 100 includes, but is not limited to, one or more client systems 101-102 communicatively coupled to storage system 104 over network 103. Clients 101-102 may be any type of clients such as a server, a personal computer (e.g., desktops, laptops, and tablets), a "thin" client, a personal digital assistant (PDA), a Web enabled appliance, a gaming device, a media player, or a mobile phone (e.g., Smartphone), etc. Network 103 may be any type of networks such as a local area network (LAN), a wide area network (WAN) such as Internet, a corporate intranet, a metropolitan area network (MAN), a storage area network (SAN), a bus, or a combination thereof, wired and/or wireless.

Storage system 104 may include any type of server or cluster of servers. For example, storage system 104 may be a storage server used for any of various different purposes, such as to provide multiple users with access to shared data and/or to back up mission critical data. Storage system 104 may be, for example, a file server (e.g., an appliance used to provide network attached storage (NAS) capability), a block-based storage server (e.g., used to provide SAN capability), a unified storage device (e.g., one which combines NAS and SAN capabilities), a nearline storage device, a direct attached storage (DAS) device, a tape backup device, or essentially any other type of data storage device. Storage system 104 may have a distributed architecture, or all of its components may be integrated into a single unit. Storage system 104 may be implemented as part of an archive and/or backup system such as a deduplicating storage system available from EMC® Corporation of Hopkinton, Mass.

In one embodiment, storage system 104 includes, but is not limited to, backup engine 106, deduplication storage engine 107, and one or more storage units 108-109 communicatively coupled to each other. Storage units 108-109 may be implemented locally (e.g., single node operating environment) or remotely (e.g., multi-node operating environment) via interconnect 120, which may be a bus and/or a network. In one embodiment, one of the storage units 108-109 operates as an active storage to receive and store external or fresh user data, while the other storage unit operates as a target storage unit to periodically archive data from the active storage unit according to an archiving policy or scheme. Storage units 108-109 may be, for example, conventional magnetic disks, optical disks such as CD-ROM or DVD based storage, magnetic tape storage, magneto-optical (MO) storage media, solid state disks, flash memory based devices, or any other type of non-volatile storage devices suitable for storing large volumes of data. Storage units 108-109 may also be combinations of such devices. In the case of disk storage media, the storage units 108-109 may be organized into one or more volumes of Redundant Array of Inexpensive Disks (RAID).

In response to a data file to be stored in storage units 108-109, optional deduplication storage engine 107 is configured to segment the data file into multiple chunks according to a variety of segmentation policies or rules. Deduplication storage engine 107 may choose not to store a chunk in a storage unit if the chunk has been previously stored in the storage unit. In the event that deduplication storage engine 107 chooses not to store the chunk in the storage unit, it stores metadata enabling the reconstruction of the file using the previously stored chunk. As a result, chunks of data files are stored in a deduplicated manner, either within each of storage units 108-109 or across at least some of storage units 108-109. Data stored in the storage units may be stored in a compressed form (e.g., lossless compression: Huffman coding, Lempel-Ziv Welch coding; delta encoding: a reference to a chunk plus a difference; etc.). In one embodiment, different storage units may use different compression methods (e.g., main or active storage unit from other storage units, one storage unit from another storage unit, etc.).

The metadata, such as metadata 110-111, may be stored in at least some of storage units 108-109, such that files can be accessed independent of another storage unit. Metadata of each storage unit includes enough information to provide access to the files it contains. In one embodiment, metadata may include fingerprints contained within data objects 112-113, where a data object may represent a data chunk, a CR of data chunks, or a container of one or more CRs. Fingerprints are mapped to a particular data object via metadata 110-111, enabling the system to identify the location of the data object containing a chunk represented by a particular fingerprint. When an active storage unit fails, metadata contained in another storage unit may be utilized to recover the active storage unit. When one storage unit is unavailable (e.g., the storage unit has failed, or is being upgraded, etc.), the system remains up to provide access to any file not stored in the failed storage unit. When a file is deleted, the metadata associated with the files in the system is updated to reflect that the file has been deleted.

In one embodiment, the metadata information includes a file name, a storage unit where the chunks associated with the file name are stored, reconstruction information for the file using the chunks, and any other appropriate metadata information. In one embodiment, a copy of the metadata is stored on a storage unit for files stored on a storage unit so that files that are stored on the storage unit can be accessed using only the information stored on the storage unit. In one embodiment, a main set of metadata information can be reconstructed by using information of other storage units associated with the storage system in the event that the main metadata is lost, corrupted, damaged, etc. Metadata for a storage unit can be reconstructed using metadata information stored on a main storage unit or other storage unit (e.g., replica storage unit). Metadata information further includes index information (e.g., location information for chunks in storage units, identifying specific data objects).

In one embodiment, the storage system as shown in FIG. 1 may be used as a tier of storage in a storage hierarchy that comprises other tiers of storage. One or more tiers of storage in this hierarchy may utilize different kinds of storage devices and/or may be optimized for different characteristics such as random update performance. Files are periodically moved among the tiers based on data management policies to achieve a cost-effective match to the current storage requirements of the files. For example, a file may initially be stored in a tier of storage that offers high performance for reads and writes. As the file ages, it may be moved into a tier of storage according to one embodiment of the invention. In various embodiments, tiers include different storage technologies (e.g., tape, hard drives, semiconductor-based memories, optical drives, etc.), different locations (e.g., local computer storage, local network storage, remote network storage, distributed storage, cloud storage, archive storage, vault storage, etc.), or any other appropriate storage for a tiered data storage system.

Referring back to FIG. 1, according to one embodiment, backup engine 106 includes an access predictor 114, access manager 115, and cache 116. Access manager 115 is to provide file services to a variety of clients, such as a backup/restore application, to backup files stored in storage units 108-109, in this example, represented as data objects 112-113 that may be optionally deduplicated by deduplication storage engine 107. Typically, when a request is received to access a file such as a backup file, data objects of the requested file are loaded into a memory of storage system 104. Since the file may be large, only a portion of data objects of the file is loaded or cached in the memory at a time for accessing. In one embodiment, in response to a request to read a portion of a file from storage units 108-109, future requests to the storage units 108-109 are predicted based on the received request and/or metadata of the file. Subsequent access of the file is optimized based on the prediction, for example, including managing a data cache, prefetching data, or scheduling the order in which requests are handled. The prediction may be performed based on types of a file, sequential access of the file, responsive to a command from a client application such as backup application or antivirus program, etc.

When a data chunk is being accessed, the data object containing the chunk is loaded into cache 116 and the request is then serviced using the data object from the cache. Cache 116 may be allocated as a designated memory region of the system memory, which is typically limited in size. When a data object is requested for access, access manager 115 inspects cache 116 to determine whether the requested data object is in cache 116. If so (e.g., cache hit), the data object from cache 116 is used to service the request. If the requested data object is not in cache 116 (e.g., cache miss), access manager 115 is to load the requested data object from storages 118-119 into cache 116. If cache 116 is full, a data object currently stored in cache 116 has to be evicted from cache 116 to make room for the data object currently requested. A data object may represent a data chunk, a CR of multiple data chunks, or a container of multiple CRs. According to one embodiment, multiple data objects, such as a CR or a container, may be read into the memory from storage units 108-109. However, only the related individual data chunks may be cached in cache 116.

According to one embodiment, when a file such as a backup file is retrieved and accessed from a backup storage system, access predictor 114 is to predict based on metadata (e.g., fingerprints) of data objects of the file whether a data object occurred at a first portion or location of the file is likely to be subsequently accessed again at a second portion or location of the file. Based on the prediction, certain actions may be performed to improve subsequent access of the data object, for example, with better prefetching, caching, and/or scheduling. In one embodiment, a data object that is likely to be accessed again subsequently within the same file may be cached in cache 116 such that subsequent access of the same data object later on can be improved. According to an alternative embodiment, based on the metadata, a related file may be identified and certain actions may also be performed on the related file to improve subsequent access of the related file.

In addition, an efficient cache replacement scheme is employed based on the prediction to further improve data access performance. In one embodiment, the access manager 115 is to evict a data object from cache 116 that would be unlikely to be accessed again or likely to be accessed in the same file farthest in the future based on the prediction. That is, a data object that is unlikely to be accessed again within the same file (or a stream of one or more related files) is considered as a top candidate for eviction. If every object currently in the cache is likely to be accessed again within the same file or a related file, no cache replacement algorithm can achieve a better cache hit rate than one that evicts the object that will be accessed farthest in the future. In practice, any object that will not be reaccessed for "a while" is an equally good candidate for eviction from the cache as long as there is no other object that, if evicted, can result in a better cache hit rate. Herewith we use the term "a while" to indicate a long enough interval that retaining an object in the cache in preference to another object will result in a lower cache hit rate, that is, it represents an equivalence class of all objects that will be evicted from the cache by the optimal cache replacement policy, prior to being reaccessed. An efficient cache eviction scheme with an approximately optimal cache hit rate would evict any object that is unlikely to be accessed again, and in the absence of any available objects that will not be reaccessed, would evict an object that will not be reaccessed for "a while". Such an efficient eviction scheme can be implemented using various lookahead prediction methods.

Figure 2A:
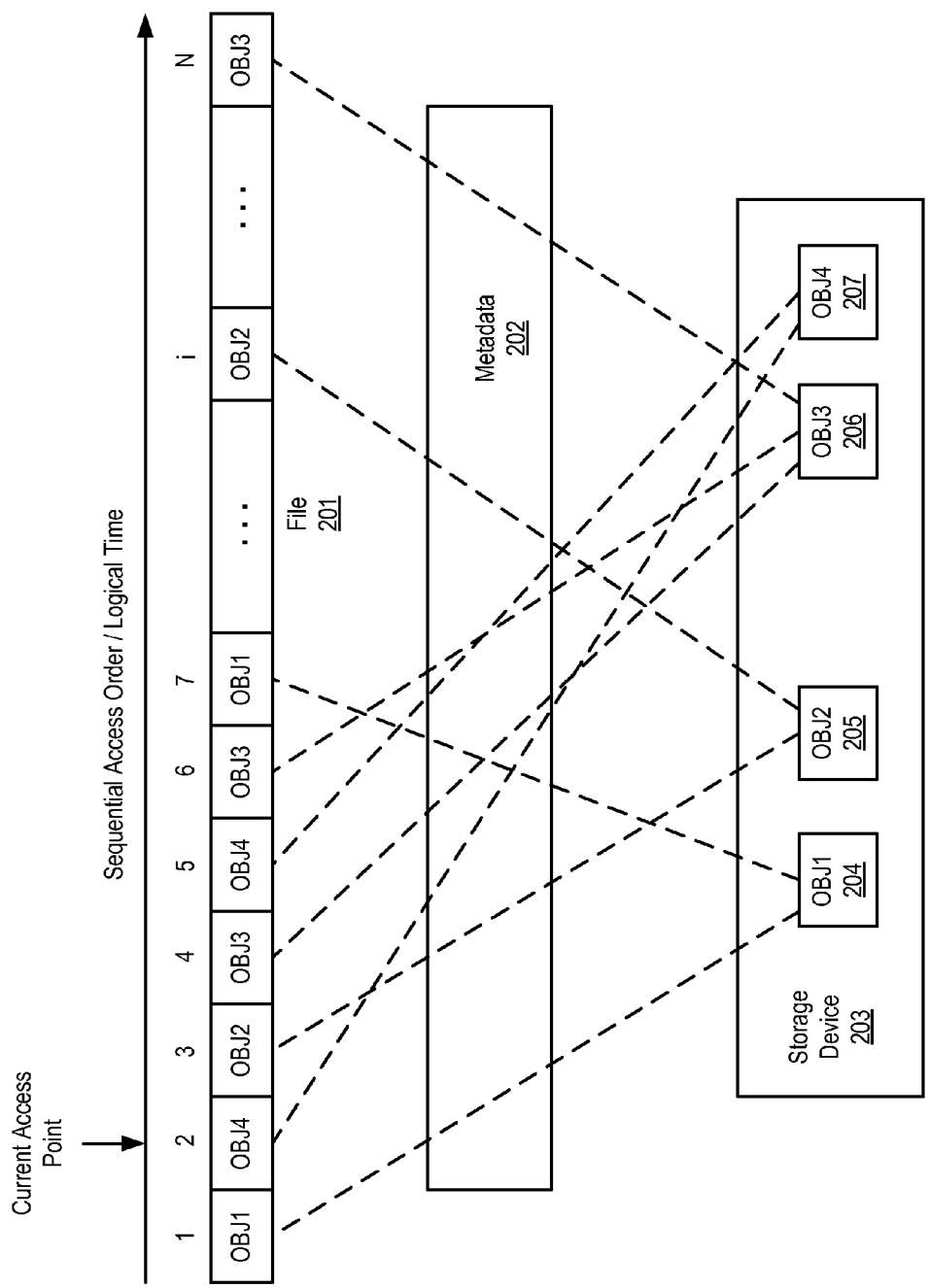
FIG. 2A is a block diagram illustrating a process for retrieving a file from storage according to one embodiment of the invention.

FIG. 2A is a block diagram illustrating a process for retrieving a file from storage according to one embodiment of the invention. Referring to FIG. 2A, file 201 (e.g., a backup file) includes many data objects to be sequentially accessed. For example, a media file such as an audio or video file is typically read sequentially. Alternatively, a client application such as a backup application or antivirus program may instruct the storage system to read the data objects in sequence. In this example, the storage system as shown is a deduplicated storage system, where only the deduplicated data objects 204-207 are stored in storage device 203, while file 201 contains many data objects that are formed from the deduplicated data objects 204-207. Any one of deduplicated data objects 204-207 may occur in multiple locations within file 201, which may be recorded via metadata 202. In this example, for the purpose of illustration, there are four deduplicated data objects: OBJ1, OBJ2, OBJ3, and OBJ4. Often, more deduplicated data objects are used to construct a file.

According to one embodiment, an access predictor, such as access predictor 114 of FIG. 1, is to predict the access timing of each of objects 204-207 based on metadata 202 associated with file 201. Based on the predicted access timing, an access manager, such as access manager 115 of FIG. 1, is to perform certain actions that will improve the subsequent access of the objects 204-207. In one embodiment, based on the predicted access timing of a particular data object, the access manager can prefetch the data object from storage device 203 into a memory prior to the access time of the corresponding data object. For example, given the current access order is at access order or sequence order of 2 as shown in FIG. 2A, it is predicted that OBJ4 and OBJ2 will be accessed at the access orders 2 and 3 based on metadata 202. Even though OBJ4 is the next object to be referenced, it is more efficient to read OBJ2 along with OBJ1 before reading OBJ4, and then to read OBJ3 along with OBJ4 in anticipation of its use at time 4. In such a situation, the access manager can prefetch OBJ2, OBJ4, and OBJ3 from storage device 203 into the cache memory, such that at the access order 2-4, OBJ4, OBJ2, and OBJ3 are available from the memory without having to retrieve the same from storage device 203 at that time.

According to another embodiment, the access manager may maintain a particular data object in the cache memory if the access predictor predicts that the data object will be accessed again soon. For example, it is assumed that given the current access order at access order 4, OBJ4 and OBJ3 may be maintained in the cache memory in response to a cache space reclamation request, since they will be accessed in the next access orders 5-6. LRU caching would be similarly effective at keeping OBJ4 and OBJ3 in memory because they would have been accessed very recently. But looking ahead, OBJ2 is referenced significantly later (at access order i) and OBJ3 is referenced significantly later than that (at access order N). According to one embodiment, if there is a need to evict a data object from the cache memory, a data object that will not be accessed for a while may be considered as a top eviction candidate. In this example, when OBJ1 is accessed at access order 8, OBJ2 is the least recently used of the four objects, and with LRU caching it might be removed from the cache to make room for OBJ1. But according to one embodiment, by predicting that OBJ2 will be used at access order i before OBJ3 or OBJ4 is rereferenced, OBJ3 or OBJ4 would be a preferred candidate for eviction. Since OBJ3 is accessed at access order N and OBJ4 is not accessed again, if there is a need to evict a data object from the cache memory, OBJ4 will be evicted first.

FIG. 2B is a flow diagram illustrating a method for efficiently providing file services in a storage system according to one embodiment of the invention. Method 250 may be performed by backup engine 106 of FIG. 1, which may be implemented as processing logic in software, hardware, or a combination of both. Note that throughout this application, a backup storage system is utilized as an example of a storage system. The techniques described throughout this application can also be applied to other types of storage systems. For example, backup engine 106 can be implemented as any type of file servers. Referring to FIG. 2B, at block 251, a request for accessing a file of a storage system is received, where the file is presented by data objects such as deduplicated data chunks, where the data chunks may be stored in CRs and the CRs may be stored in containers. At block 252, a first portion of data objects of the file is retrieved to service the request. At block 253, processing logic predicts whether any of the data objects in the first portion will likely be accessed subsequently in a second portion of the file. If a data object is predicted to be likely accessed again, the processing logic further determines or estimates when (e.g., how far from the current access time slot, or access sequence number or order) the data object is to be accessed subsequently. At block 254, the prediction is used to improve access performance of the data objects subsequently accessed during accessing the second portion of the file. For example, the data objects that is likely accessed again subsequently may be maintained in the cache, while data objects that would not be accessed for a while may be evicted from the cache to make room for other data objects that are currently being accessed.

Figure 3:
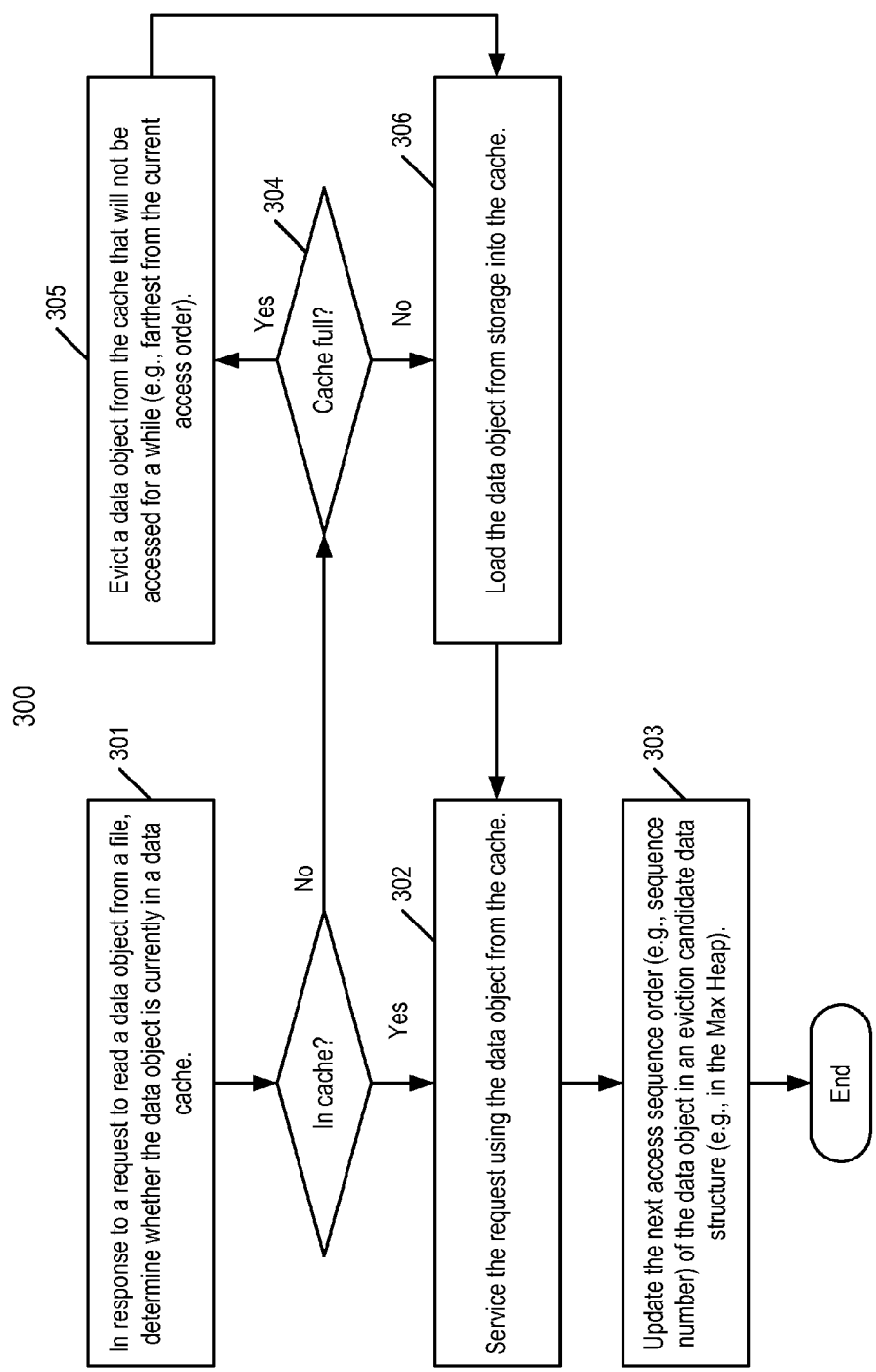
FIG. 3 is a flow diagram illustrating a method for efficiently providing file services in a storage system according to another embodiment of the invention.

FIG. 3 is a flow diagram illustrating a method for efficiently providing file services in a storage system according to another embodiment of the invention. Method 300 may be performed by backup engine 106 of FIG. 1, which may be implemented as processing logic in software, hardware, or a combination of both. Referring to FIG. 3, at block 301, in response to a request to read a data object from a file (e.g., a backup file), processing logic determines whether the data object is currently in a data cache. The data object may be one of many data objects (e.g., deduplicated data objects) of a file being retrieved or restored. In a deduplicated storage system, a file may contain many deduplicated data objects that may occur at multiple locations within the file. If the requested data object is located in the data cache, at block 302, the request is serviced using the data object from the data cache. Thereafter, at block 303, the next access time or order (e.g., sequence number) of the data object is updated in an eviction candidate data structure, such as a max heap data structure, to indicate when will be the next time the same data object is to be accessed within the same file. Such information can be used subsequently during a cache eviction process to determine which of the data objects in the cache should be evicted first, which is not necessarily the LRU ones.

If the requested data object is not in the cache, at block 304, processing logic determines whether the cache is currently full. If the cache is not full, at block 306, the requested data object is loaded from the storage into the cache, and the request is serviced using the data object from the cache at block 302 and the next access sequence order of the data object is updated in the eviction candidate data structure at block 303. If the cache is full, at block 305, processing logic evicts a data object from the cache that will not be accessed for a while to make room for the requested data object loaded from the storage. In one embodiment, a data object that will be accessed in a sequence order that is farthest from the current access sequence order is considered as a top eviction candidate. Such a data object may be identified based on their next access sequence number that is stored in the eviction candidate data structure which is updated at block 303. Once there is room in the cache after the eviction, at block 306, the requested data object is loaded from the storage into the cache. Thereafter, at block 302, the request is serviced from the cache and at block 303, the next access sequence order of the data object is updated in the eviction candidate data structure.

Various cache replacement or eviction methods can be employed to efficiently manage the cache for a storage system, particularly, a deduplication storage system. According to one embodiment, a cache replacement method can be implemented using an access-ordering lookahead approach, a bloom filter lookahead approach, or a combination thereof, which will be described in details further below.

Figure 4A:
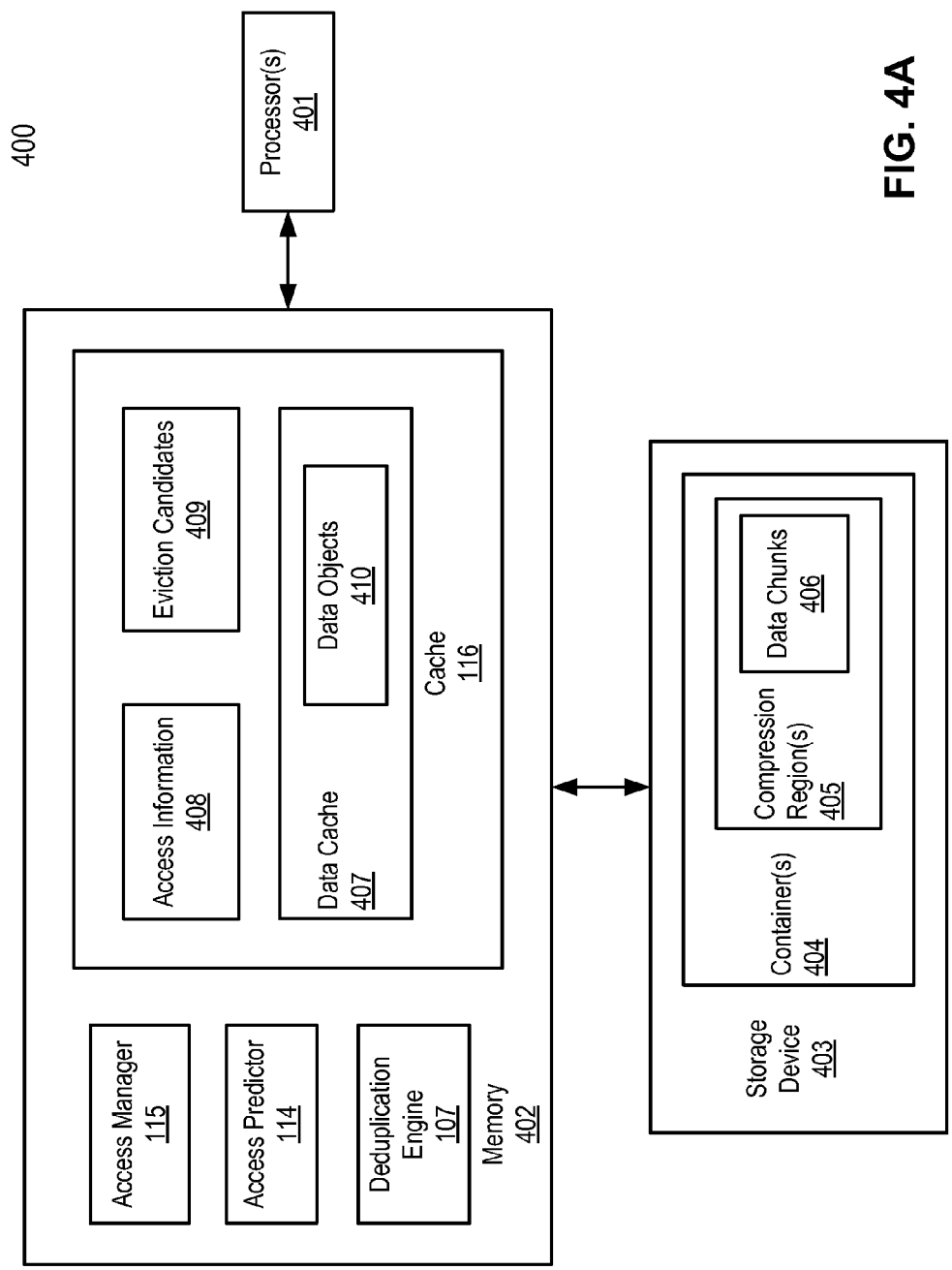
FIGS. 4A-4C are block diagrams illustrating a storage system using an efficient cache replacement method according to certain embodiments.

FIG. 4A is a block diagram illustrating a backup storage system using an efficient cache replacement method according to one embodiment. System 400 may be implemented as part of storage system 104 of FIG. 1. Referring to FIG. 4A, access manager 115 and access predictor 114 are executed in memory 402 by one or more processors or processor cores 401. In addition, cache 116 is allocated from memory 402 specifically for managing access of data chunks 406, CRs 405, and containers 404 stored in storage unit 403. Cache 116 includes data cache 407, access information 408, and eviction candidates 409. Data cache 407 is to cache data objects 410 loaded from storage unit 403, where any of data objects 410 may, in this example, represent data chunks 406, a CR of one or more data chunks, a container of one or more CRs, or a combination thereof of a deduplication storage system. Note that throughout this application, a deduplication storage system is described as an example of a storage system; however, other types of storage systems can also be applied.

According to one embodiment, in response to a request to retrieve a file, access manager 115 is to load certain amount of data objects of the file into memory 402 and to store the data objects in data cache 407 as data objects 410 if data cache 407 has enough space. Note that the file may be a backup file with a large size. Typically, the access manager is to read a fixed number of data objects at a time dependent upon the size of the cache memory and use the cached data objects to service the file service requests. In one embodiment, in determining the access order or patterns of the data objects, metadata (e.g., fingerprints) of the data objects representing the file is loaded into the memory and analyzed. Since the file may be a large file and metadata of the file may also be relatively large, only a portion of the metadata representing a sequence of data objects to be accessed at a fixed period of time is loaded, where the fixed period of time is referred to as an access window. That is, access predictor 114 and access manager 115 process a fixed amount of metadata at a time limited by the size of an access window. Once a certain amount of the data objects of an access window has been processed, access manager 115 is to slide the access window to read a next batch of metadata of data objects of the file from storage 403.

According to one embodiment, for each of the deduplicated data objects represented within the current access window, access information of the data object is determined based on metadata of the data objects or metadata of the file and stored as part of access information 408. In one embodiment, access information 408 of a data object includes a sequence access order of the data object that will be accessed within the same file or a related file (e.g., a full backup file with one or more incremental backup files). The sequence access order may be represented by a list of sequence numbers representing logical time or logical order that the data object will be accessed in the file. In a deduplicated storage system, a file may be represented by many deduplicated data objects. A deduplicated data object may occur in multiple locations of the file and may be accessed multiple times when the file is read. Based on access information 408, in one embodiment, access predictor 114 can predict when a particular data object is to be accessed next time within the same file. Access predictor 114 is to populate eviction candidate data structure 409 to indicate the next access time (e.g., sequence number) of each unique or deduplicated data object.

Figure 4B:
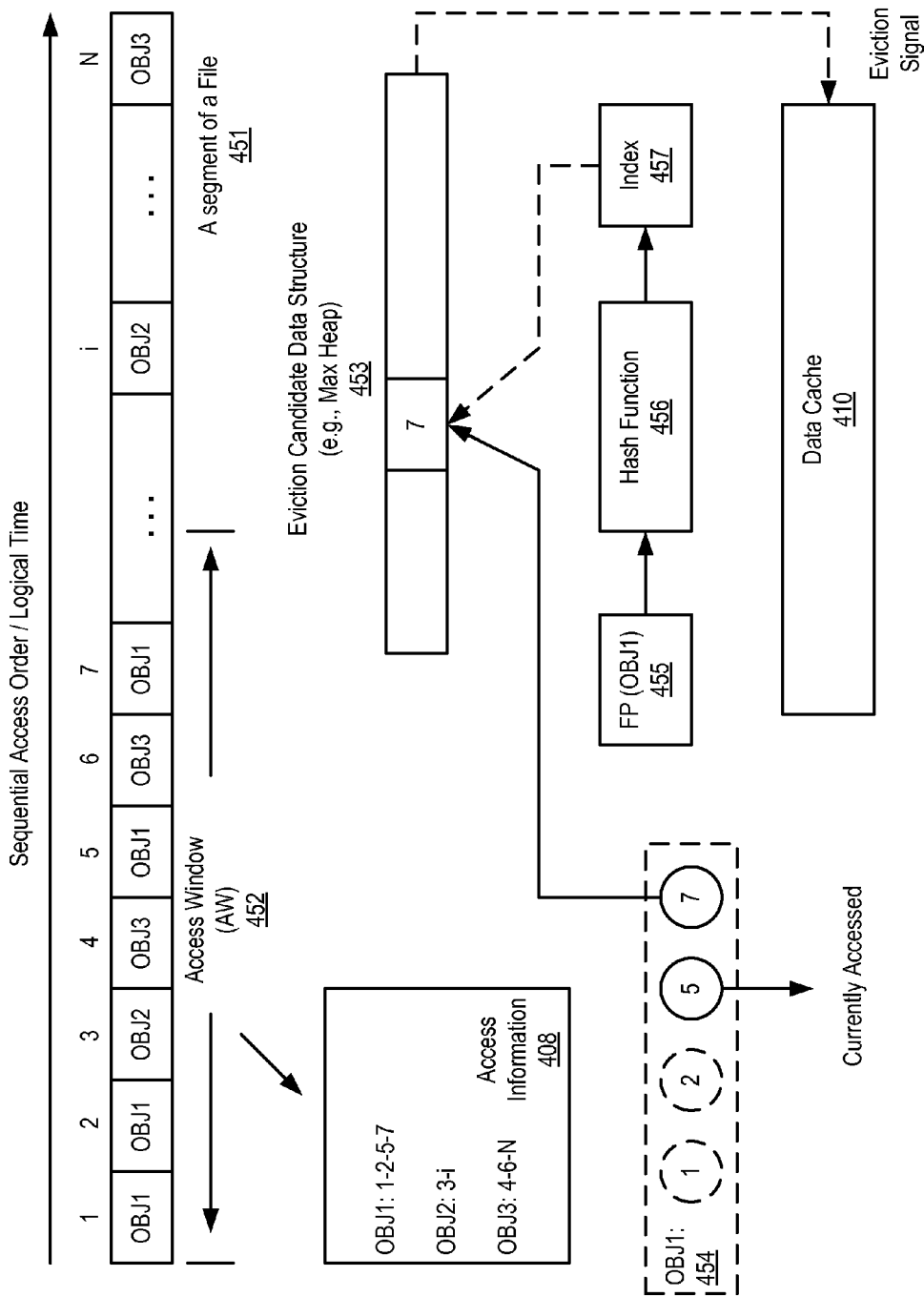

In one embodiment, in predicting whether a data object is likely accessed subsequently, access predictor 114 is to look ahead and parse metadata of data objects within an access window that covers a certain amount of data objects of the file to be accessed, where the access window is a sliding access window to read a certain amount of metadata of data objects of a file into the memory at a time (since the file may be a backup file in a large size). The logical access orders of the data objects within the access window are obtained and retained in memory 407 as part of access information 408. When a data object is accessed and stored in cache 407, the next access sequence order/number of the data object is recorded in eviction candidate data structure 409 such as a max heap data structure. The data structure 409 is used to maintain a reference of a data object with largest or latest next access order with respect to a current access order or time. During a cache eviction process, a data object associated with the largest or highest access order can be identified from data structure 409 and evicted from cache 407. When a certain amount (e.g., a predetermined threshold) metadata of data objects of the current access window has been processed, the process will slide onto a next access window (e.g., sliding the window to subsequent data objects in the file). This approach is referred to as an access-ordering lookahead approach. FIG. 4B is a block diagram illustrating an access-ordering lookahead process according to one embodiment of the invention. Referring to FIG. 4B, file 451 is requested for access, where file 451 includes many data objects that will be accessed sequentially. As described above, only a portion of metadata of data objects represented by access window 452 is loaded at a given time in memory. Once metadata of data objects of access window 452 is loaded in memory, the access predictor such as access predictor 114 is to parse the metadata (e.g., fingerprints) of the data objects to determine access information 408, which includes access sequence order of each unique or deduplicated data object.

In this example, there are three deduplicated data objects OBJ1, OBJ2, and OBJ3 within access window 452. For OBJ1, it will be accessed in the order of 1-2-5-7. OBJ2 will be accessed in the order of 3-i while OBJ3 will be accessed in the order of 4-6-N. In addition, a max heap data structure or module 453 is utilized as an eviction candidate data structure (data structure 409) to store the top eviction candidate that will be evicted first during the cache eviction process.

A heap is a data structure created using a binary tree. It can be seen as a binary tree, where all levels of the tree, except possibly the last one (deepest) are fully filled. If the last level of the tree is not complete, the nodes of that level are filled from left to right. Each node is related to each of its children according to a comparison predicate defined for the data structure. Heaps with a mathematical "greater than or equal to" comparison function are referred to as max heaps; those with a mathematical "less than or equal to" comparison function are referred to as Min Heaps. For the purpose of determining a top eviction candidate, a max heap is utilized as an eviction candidate data structure according to one embodiment. It will be appreciated that other types of data structures and/or algorithms may also be utilized. It is also appreciated that other types of files other than backup files, which are likely accessed sequentially (e.g., media files such as audio, video, or image files), may also be applied herein.

Referring back to FIG. 4B, it is assumed that the data objects in backup file 451 are accessed sequentially. When data objects of access window 452 are loaded in the memory, access information 408 is generated based on the metadata associated with the data objects and/or file 451. When a data object is accessed, the next access sequence number (representing a logical access time slot) of the data object is determined based on its access information. The next access sequence number, as well as certain identifying information that identifies the corresponding data object, is then stored in an entry of max heap 453 corresponding to the data object, for example, via a max heap processing function or module (not shown). A max heap function provides an interface to allow other modules to insert (push) an entry into and remove (pop) an entry from the data structure. When a new entry is inserted, the max heap function will automatically store the entries based on their property values, in a hierarchy in which all paths from the root to a leaf are ordered from maximum to minimum. When an entry is popped from the max heap data structure, the entry with the maximum property value will be removed. In this example, an entry with the maximum property value represents a data object with the maximum sequence number among all data objects. Such a data object will be accessed in the farthest sequential order (e.g., will not be accessed for a while).

For purpose of illustration, it is assumed that at this moment, OBJ1 is being accessed at the sequence number of 5. In response, the next sequence number of the same data object, in this example sequence number 7, is determined based on the access information 454 associated with OBJ1. In addition, an entry associated with OBJ1 in max heap data structure 453 is determined. The sequence number of 7 is then inserted into the entry associated with OBJ1 of max heap data structure 453. Note that max heap data structure 453 includes many entries, each being associated with a unique or deduplicated data object. In this example, max heap data structure 453 includes at least three entries, one for each of the deduplicated OBJ1-OBJ3. In determining the entry of max heap 453 for a data object such as OBJ1, according to one embodiment, metadata such as fingerprint 455 of OBJ1 is hashed using hash function 456 (e.g., SHA-1 or MD5) to generate an index value referencing to an entry associated with the data object.

During the cache space reclamation or eviction process, the max heap function is invoked to pop the top entry from the max heap data structure 453, which corresponds to a data object with the maximum sequence number amongst the data objects represented in max heap data structure 453. The maximum sequence number represents the farthest logical time that the corresponding data object will next be accessed, compared to the next access logical time of other data objects. The corresponding data object is then identified based on the metadata (and the associated sequence number) and the data object can be evicted from data cache 410 to make room for another data object.

FIG. 5 is a flow diagram illustrating a method for accessing data objects according to one embodiment of the invention. Method 500 may be performed by system 400 of FIG. 4A. Referring to FIG. 5, at block 501, data objects of a file (e.g., backup file) that are being sequentially accessed are cached in a cache memory of a data processing system. At block 502, processing logic determines the sequential access order of the cached data objects based on metadata of the file. At block 503, in response to cache space reclamation, a data object, whose next access is farthest amongst the cached data objects, is evicted first based on the sequential access order.

Figure 6A:
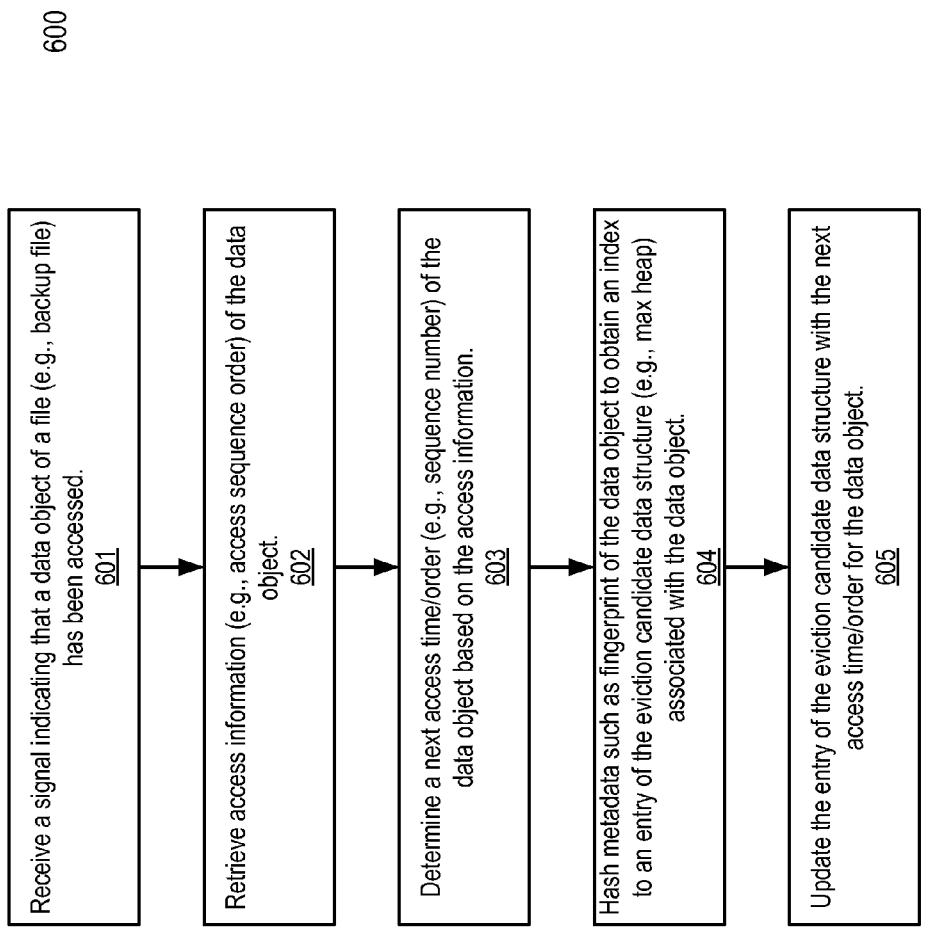
FIG. 6A is a flow diagram illustrating a method for performing access prediction according to one embodiment of the invention.

FIG. 6A is a flow diagram illustrating a method for performing access prediction according to one embodiment of the invention. Method 600 may be performed by system 400 of FIG. 4A. For example, method 600 may be performed as part of operations involved at block 303 of FIG. 3. Referring to FIG. 6, at block 601, processing logic receives a signal indicating that a data object of a file has been accessed, where the data object is one of many data objects included in the file. At block 602, access information is retrieved for the data object. The access information may be compiled based on the associated metadata when the data object is loaded into the memory from storage. At block 603, a next access time or sequence number of the data object is determined based on the access information. At block 604, metadata (e.g., fingerprint) of the data object is hashed to obtain an index linked to an entry of an eviction candidate data structure (e.g., max heap data structure). Thereafter, at block 605, the next access information is stored in the entry.

Figure 6B:
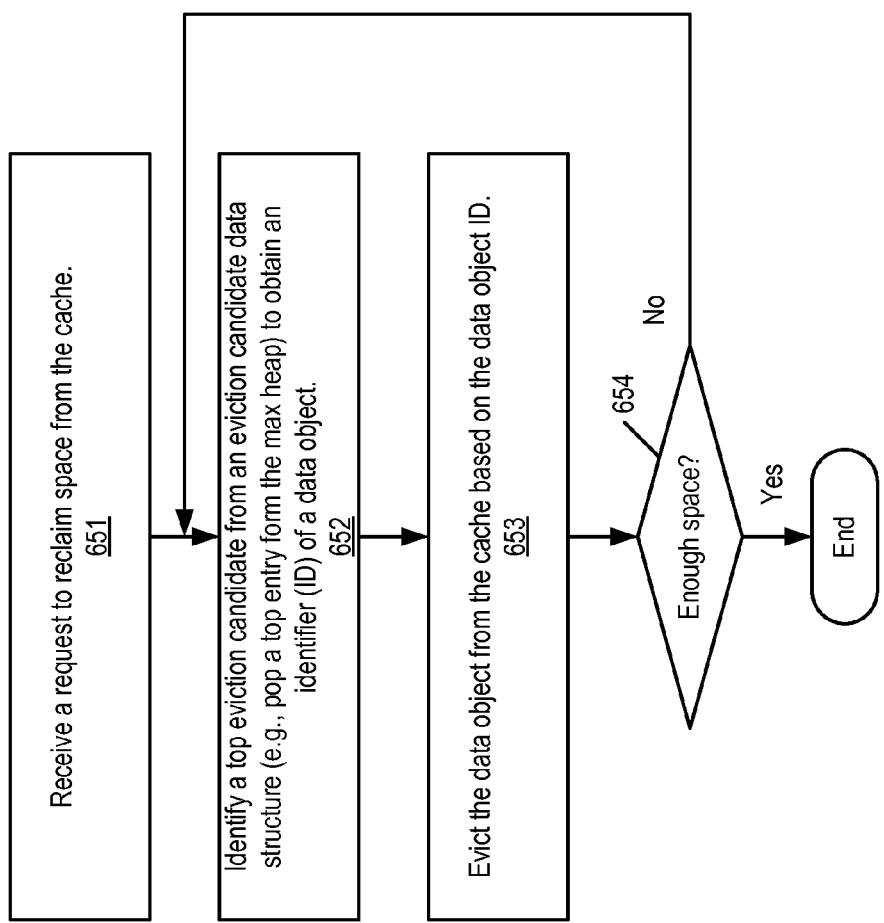
FIG. 6B is a flow diagram illustrating a method for cache space reclamation according to one embodiment.

FIG. 6B is a flow diagram illustrating a method for cache space reclamation according to one embodiment. Method 650 may be performed as part of operations involved at block 305 of FIG. 3. Referring to FIG. 6B, at block 651, a request to reclaim space from the cache is received. At block 652, a top eviction candidate is identified from an eviction candidate data structure (e.g., popping a top entry from the max heap data structure) to obtain an identifier of a data object. At block 653, the identified data object is evicted from the cache. At block 654, it is determined whether enough cache space has been reclaimed; if not, the above process is iteratively performed.

The access-ordering lookahead approach described above keeps track the access information such as the exact access order of each unique or deduplicated data object over the span of an access window, such that a data object that will be accessed next time in the farthest order can be identified and evicted first from the cache during a cache space reclamation process. Typically, the access information is maintained in a data structure such as a linked list data structure. Dependent upon the size of the access window or number of deduplicated data objects occurred in the access window, the memory or other resources needed to accommodate such a data structure for storing the access information can quickly become very large. As there are many chunks per CR and many CRs per container, storing the access information at the granularity of individual chunks requires the most space, while storing it at the granularity of containers requires the least space.

Figure 4C:
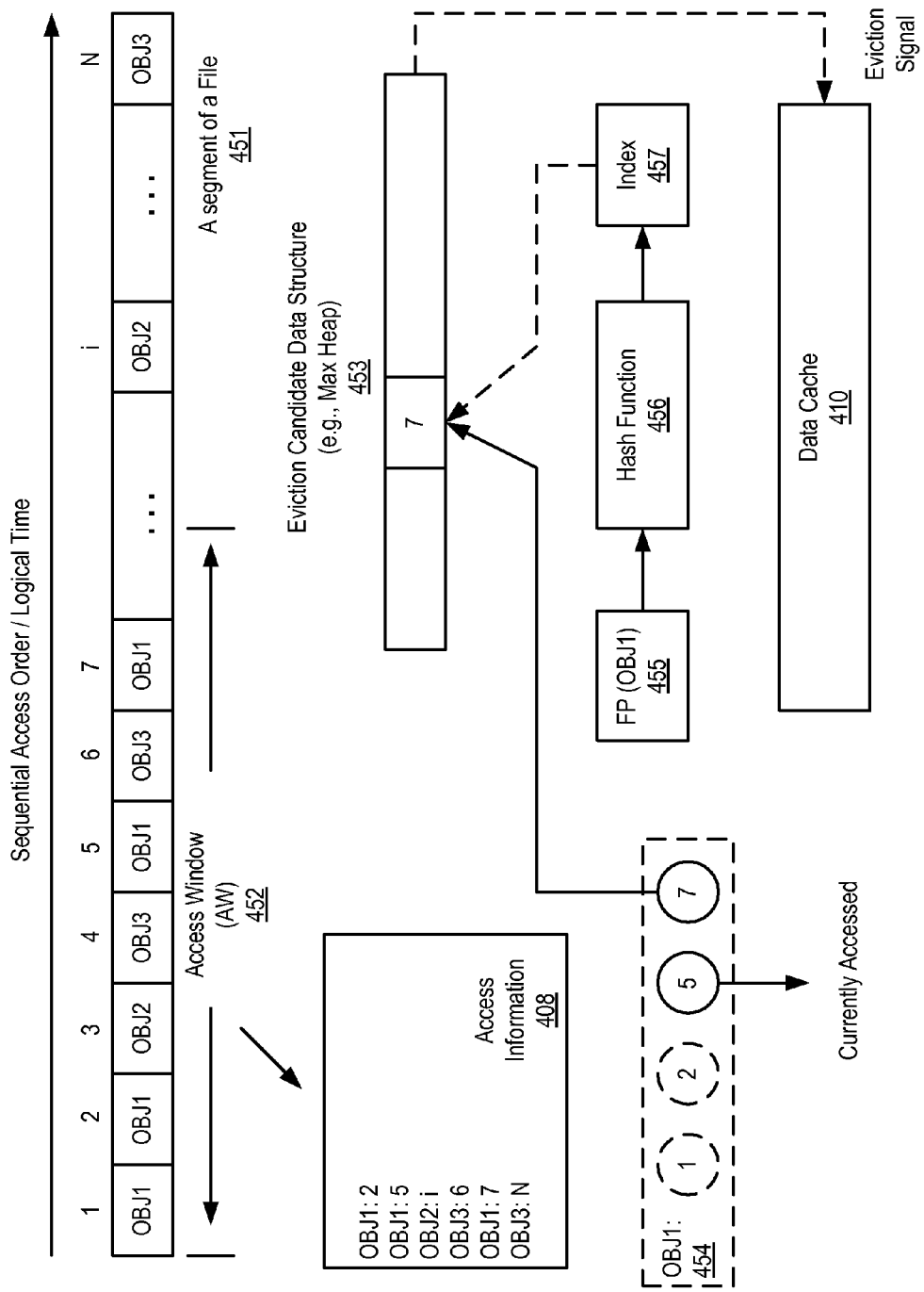

According to one embodiment, the memory required to track the order of individual chunks is reduced by preprocessing the access orders as described above. However, rather than storing each individual access associated with each object, as described above, in this embodiment the sequence of accesses is annotated on disk (or other mass storage system including a flash-based storage system), such that each reference to an object contains an annotation indicating the access order of the next reference to the object. That is, as shown in FIG. 4C, access information 408 would contain OBJ1: 2, OBJ2: 3, and OBJ3: 4, etc. When OBJ1 is read at access order 2, for example, its state would reflect that its next access would be at access order 5 and annotated information "OBJ1: 5" is recorded in access information 408. Similarly, when OBJ2 is accessed at access order 3, the next access order of the OBJ2 (e.g., OBJ2: i) is recorded in access information 408. The access information 408 may be organized on disk based on the access order, allowing the access information for multiple upcoming accesses to be prefetched in one I/O. Alternatively it may be maintained in another layer of the storage hierarchy, including memory, solid-state disks, or other media. Thus, each time an object is referenced, its next access time is updated in the max heap, but an object that is referenced many times need not have all its access order sequences stored in memory simultaneously.

According to one embodiment, the file metadata 110-111 is annotated at the time a file is created, reflecting for each object the access order of the next time that object is accessed within the file. According to one embodiment, the file metadata 110-111 is annotated subsequent to the time a file is created, reflecting for each object the access order of the next time that object is accessed within the file. Such an annotation process may be performed via a background process or some other management or maintenance processes, such as a garbage collection process.

Figure 6C:
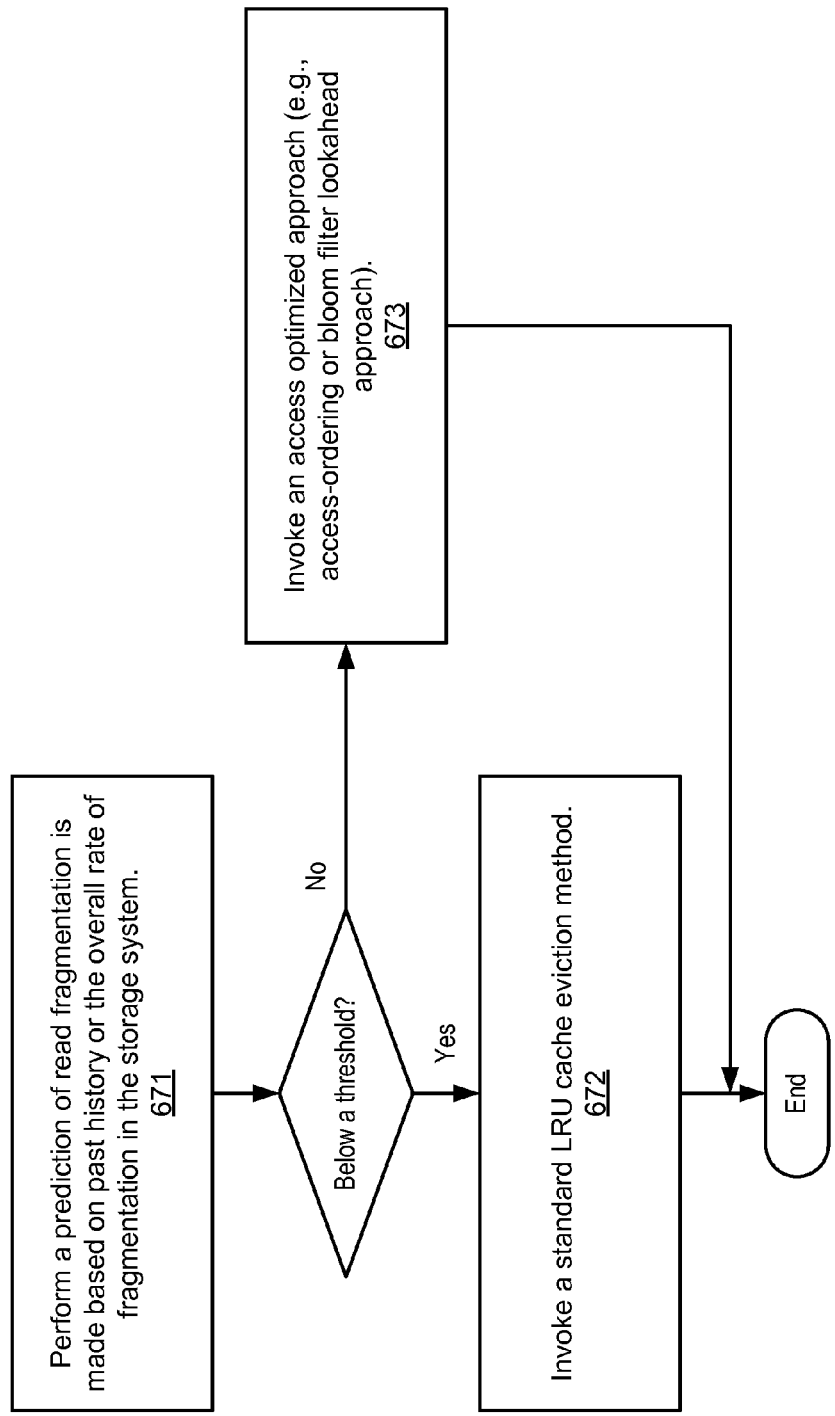
FIG. 6C is a flow diagram illustrating a method for cache space reclamation according to another embodiment.

According to one embodiment, the use of access ordering information to improve read performance is conditioned on the estimated benefit from its use. Some read operations will experience satisfactory performance without the need to use knowledge of future access patterns. Referring to FIG. 6C, at block 671 a prediction of read fragmentation is made based on past history or the overall rate of fragmentation in the storage system. If the predicted read fragmentation is below a threshold, at block 672 the standard system LRU caching is performed. If the predicted read fragmentation is at or above the threshold, at block 673 the access optimized approach is taken.

According to one embodiment, a bloom filter lookahead (also referred to as a bloom filter chain lookahead) approach is utilized to optimize the resources usage for the cache space reclamation process. A bloom filter (BF) is a method for efficiently representing existence. Bloom filters are utilized to cluster chunks into intervals that are treated as equivalence classes from the perspective of cache replacement. A data object that is brought into the cache at time T need not be cached if it will never be accessed again. Such a data object might not be cached (for long) if its next access is far in the future (e.g., it is not accessed for at least a while). But when comparing many data objects that are all next accessed far in the future, the order of those accesses is immaterial. The goal is simply not to remove something from the cache if removing something else would result in fewer misses.

According to one embodiment, an access window such as an access window under the access-ordering lookahead approach is divided into multiple (n) sub-windows (SWs), $SW_1$ to $SW_n$. Each sub-window is associated with a bloom filter and an access list to store data objects that are likely accessed during the timeframe of the respective sub-window. In essence, this coalesces all accesses within a sub-window into a single access. It also tracks the data objects efficiently by storing their presence in a sub-window by setting just a few bits (in the corresponding bloom filter). When a data object is brought into the cache, the active sub-window is the first sub-window in the chain, $SW_1$, also referred to as a current sub-window or current access window. The data object is placed on a list associated with the sub-window when it will next be referenced, $SW_i$, found via a sequential search of the BFs of future access sub-windows. It is placed on a garbage list if it will not be accessed again in the foreseeable future (e.g., within the span of the sub-windows). Eviction works in reverse, searching the garbage list first and then sub-window lists from the farthest in the future ($SW_n$) backward in time to $SW_2$, looking for a non-empty access list. The first access list containing at least one data object indicates something currently in the cache, which can be considered as a preferred candidate to evict. Note that the term of "sub-window" and "access window" are interchangeable terms dependent upon the circumstances. An access window may be considered as a sub-window of another larger access window.

Figure 7A:
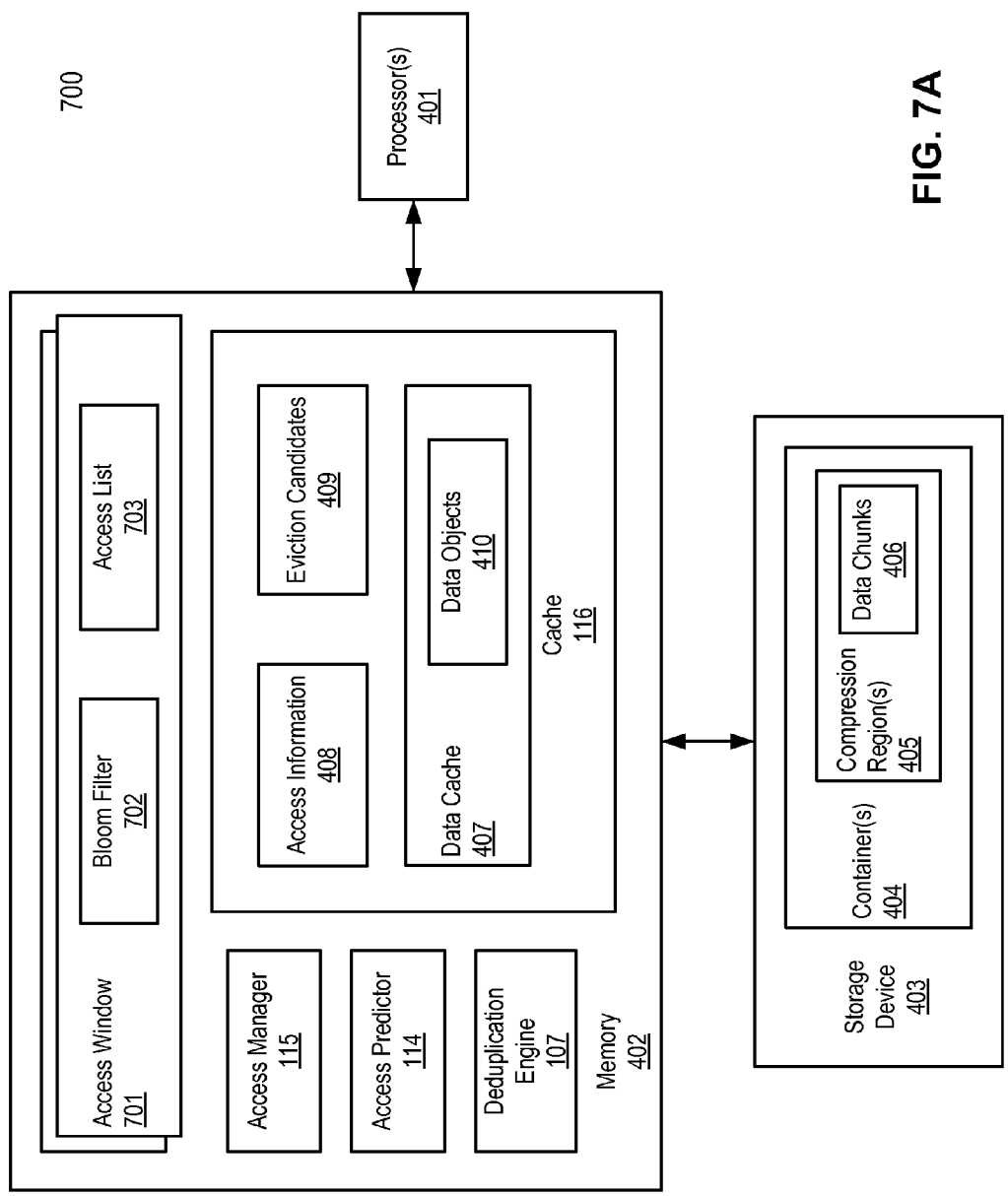
FIGS. 7A and 7B are block diagrams illustrating a backup storage system using an efficient cache replacement method according to certain embodiments.

FIG. 7A is a block diagram illustrating a backup storage system using a bloom filter lookahead approach according to one embodiment of the invention. System 700 may be implemented as part of storage system 104 of FIG. 1. Referring to FIG. 7A, similar to system 400 as shown in FIG. 4A, access manager 115 and access predictor 114 are executed in memory 402 by one or more processors or processor cores 401. In addition, cache 116 is allocated from memory 402 specifically for managing access of data chunks 406, CRs 405, and containers 404 stored in storage unit 403. Cache 116 includes data cache 407, access information 408, and eviction candidates 409. Data cache 407 is to cache data objects 410 loaded from storage unit 403, where any of data objects 410 may, in this example, represent data chunks 406, a CR of one or more data chunks, a container of one or more CRs, or a combination thereof of a deduplication storage system.

According to one embodiment, in response to a request to retrieve a file, access manager 115 is to load a certain amount of data objects of the file into memory 402 and to store the data objects in data cache 407 as data objects 410 if data cache 407 has enough space. Note that the file may be a backup file with a large size. Typically, access manager 115 is to read a fixed number of metadata (e.g., fingerprints) of data objects at a time that can be processed within an access window. Once a certain amount of metadata of the data objects of an access window has been processed, access manager 115 is to slide the access window to read a next batch of metadata of data objects of the file from storage 403.

In one embodiment, an access window herein represents multiple access windows or sub-windows 701 in a chain or sequence, which can be defined dynamically or statically. The chain of access windows represents logical access time or logical access order. Each of the access windows 701 is associated with a bloom filter 702 and an access list 703 identifying one or more data objects that will likely be accessed within a logical time period associated with the respective access window. The data objects of a file are accessed sequentially according to a sequence order defined by the chain of access windows.

According to one embodiment, when a data object is accessed at a current or active access window (i.e., the first overall access window in a chain of access windows that is used to service a current request by access manager 115), access information of the data object is determined based on metadata (e.g., fingerprint) of the data objects or metadata of the file and stored as part of access information 408. In one embodiment, access information 408 of a data object includes a sequence access order of the data object that will be accessed within the same file. The sequence access order may be represented by a list of sequence numbers representing logical time or logical order that the data object will be accessed in the file. In a deduplicated storage system, a file may be represented by many deduplicated data objects. A data object may occur in multiple locations of the file and may be accessed multiple times when the file is accessed. Based on access information 408, in one embodiment, access predictor 114 can predict when a particular data object will be accessed next time within the same file and within the current or active access window. Access predictor 114 is to populate eviction candidate data structure 409 to indicate the next access time (e.g., sequence number) of each unique or deduplicated data object.

In addition, access predictor 114 performs an estimate to approximately predict whether the data object is likely to be accessed next time during a subsequent access window. If it is determined that the data object is unlikely to be accessed in any of the subsequent access windows, the data object is indicated in a garbage list (not shown). The access predictor 114 walks through the access windows 701 in an ascending or forward order, from the nearest access window to the farthest access window with respect to the current or active access window. The information concerning whether a particular data object is likely to be accessed in a subsequent access window is maintained. In one embodiment, for each access window in the chain, metadata such as a fingerprint of a data object that is currently accessed or just has been accessed is input into a bloom filter 702 of the access window. The output from the bloom filter is utilized to indicate whether the data object is likely to be accessed in a timeframe associated with the corresponding access window, which may be stored in the corresponding access list 703. In one embodiment, each access window is associated with a separate bloom filter, which may be created dynamically or statically.

In one embodiment, during the cache space reclamation process, the access manager 115 first examines the garbage list to identify any data object listed therein (e.g., data objects that are not referenced across all the access windows) and to evict at least one data object from the garbage list. If more cache space is needed and if there is no data object listed in the garbage list, the access manager 115 walks through the access windows in a descending or backward order, from the farthest access window to the nearest access window with respect to a current access window (e.g., active access window), until the enough cache space has been reclaimed. If none of the access windows other than the current access window includes any data object candidate for eviction, according to one embodiment, the access-ordering lookahead approach, as described above, is utilized to handle the cache eviction process within the current access window based on eviction candidates 409.

Figure 7B:
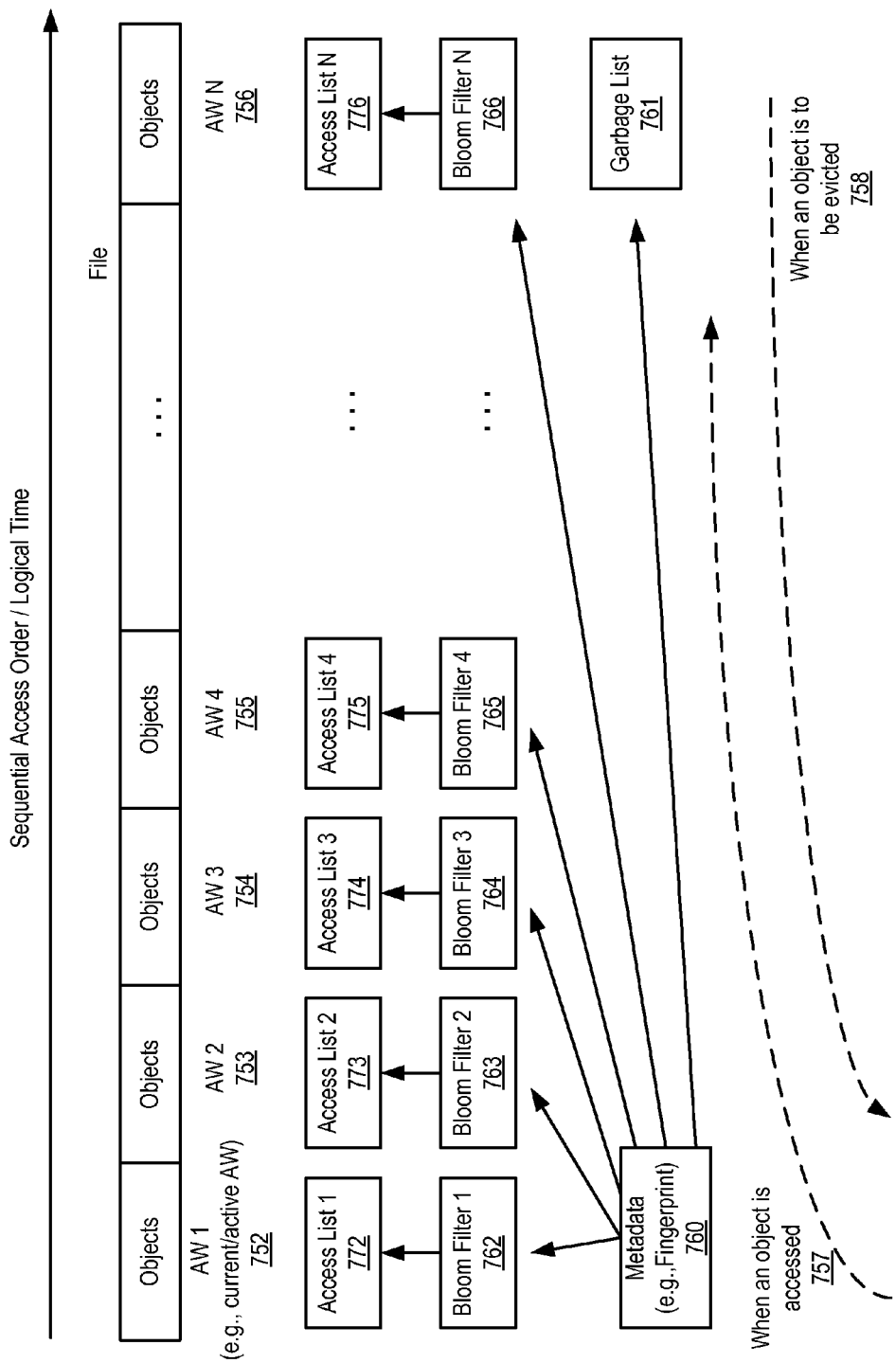

FIG. 7B is a block diagram illustrating a bloom filter lookahead process for cache management according to one embodiment of the invention. Referring to FIG. 7B, a chunk or block of file 751 that is read from storage into memory is divided into multiple access windows 752-756 (e.g., sub-windows of an access window representing the entire block of file 751). The first overall access window 752 is referred to as a current or active access window, where the data objects within the current access window are used to service a request for accessing file 751. When all data objects referenced within current access window 752 have been used to service the request, current access window 752 will be discarded and the next access window (e.g., access window 753) will become the current access window, and so on. Accesses within the new current access window (e.g. access window 753) will now be tracked sequentially using the access-ordering method described previously.

According to one embodiment, each of access windows 752-756 is associated with a bloom filter (e.g., bloom filters 762-766) and an access list (e.g., access lists 772-776), respectively. A bloom filter for each of access windows 752-756 may be different and generated dynamically or statically. An access list of an access window is to store information identifying one or more data objects that are likely to be accessed during a logical timeframe associated with the respective access window. That is, if a data object is indicated in an access list of a particular access window, a logical time of a next access of the data object likely occurs within a logical timeframe associated with that particular access window.

According to one embodiment, when a data object is being accessed during current access window 752, the access-ordering lookahead method as described above is utilized to determine the next logical access time of the data object, and to populate an eviction candidate data structure (e.g., max heap data structure) of the current access window if it is determined that the data object will be accessed again within current access window. If it is determined that the data object will not be accessed within current access window 752, the access predictor is to walk through subsequent access windows 753-756, starting from the nearest access window 753 to the farthest access window 756 to estimate whether a next access of the data object will likely occur in the respective access window.

In one embodiment, for each of subsequent access windows 753-756, metadata (e.g., fingerprint) of the data object is fed into the corresponding bloom filter. The output of the bloom filter is used to populate the corresponding access list of the respective access window. For example, in determining whether the next access time of a data object having metadata 760 will likely occur in access window 753, metadata 760 is fed into the associated bloom filter 763 and the object having metadata 760 is used to populate the corresponding access list 773. If it is estimated via bloom filter 763 that the next access time of the data object will not likely occur in access window 753, the estimation for the next access window in the chain, in this example, access window 754 is performed, by applying the corresponding bloom filter 764 to metadata 760, and so on, until one of access windows 753-756 has been identified. That is, since the process is to estimate the "next" access time of a data object, once the first one of the access windows 752-756 in the chain is identified, the process stops even though the data object may be accessed in a further access window. In one embodiment, if the data object is unlikely to be accessed in any of access windows 752-756, the data object is populated in garbage list 761 to indicate that the data object is never accessed or referenced again within the access windows 752-756 (e.g., the data object will not likely be accessed for the extent of the current lookahead window). This estimation process is performed by walking through access windows 752-756 in a forward order as indicated by path 757.

During a cache space reclamation process, according to one embodiment, the access manager is to identify and evict eviction candidates by walking through garbage list 761 and access windows 752-756 in a backward order (e.g., opposite to the estimation process), starting from garbage list 761 as indicated by path 758. According to one embodiment, cache space reclamation process starts by examining garbage list 761 to determine whether there is any eviction candidate listed therein. If it does, the data object(s) associated with the eviction candidate(s) listed in the garbage list will be evicted first. If garbage list 761 does not include any candidates and more cache space is needed, the processing logic examines access lists of access windows 753-756 in a backward order, starting from the farthest access window 756, to identify any eviction candidate for eviction, until enough cache space has been reclaimed. At a point at which none of access windows 756-753 nor the garbage list includes any eviction candidate and more cache space is needed, the processing logic performs the cache eviction process within current access window 752 using a method similar to the access-ordering lookahead approach as described above.

FIG. 8 is a flow diagram illustrating a method for accessing data objects according to one embodiment of the invention. Method 800 may be performed by system 700 as shown in FIGS. 7A and 7B, which may be performed by processing logic in software, hardware, or a combination thereof. Referring to FIG. 8, at block 801, data objects of a file are cached in a cache memory of a storage system, where the data objects will be accessed sequentially via a chain of access windows. At block 802, it is estimated in which of the access windows a next access of a data object of the file likely occurs, using a bloom filter associated with each access window. At block 803, in response to a request for cache space reclamation, a data object that will likely be accessed in a farthest access window from a current access window in the chain is evicted from the cache memory based on the estimation.

Figure 9A:
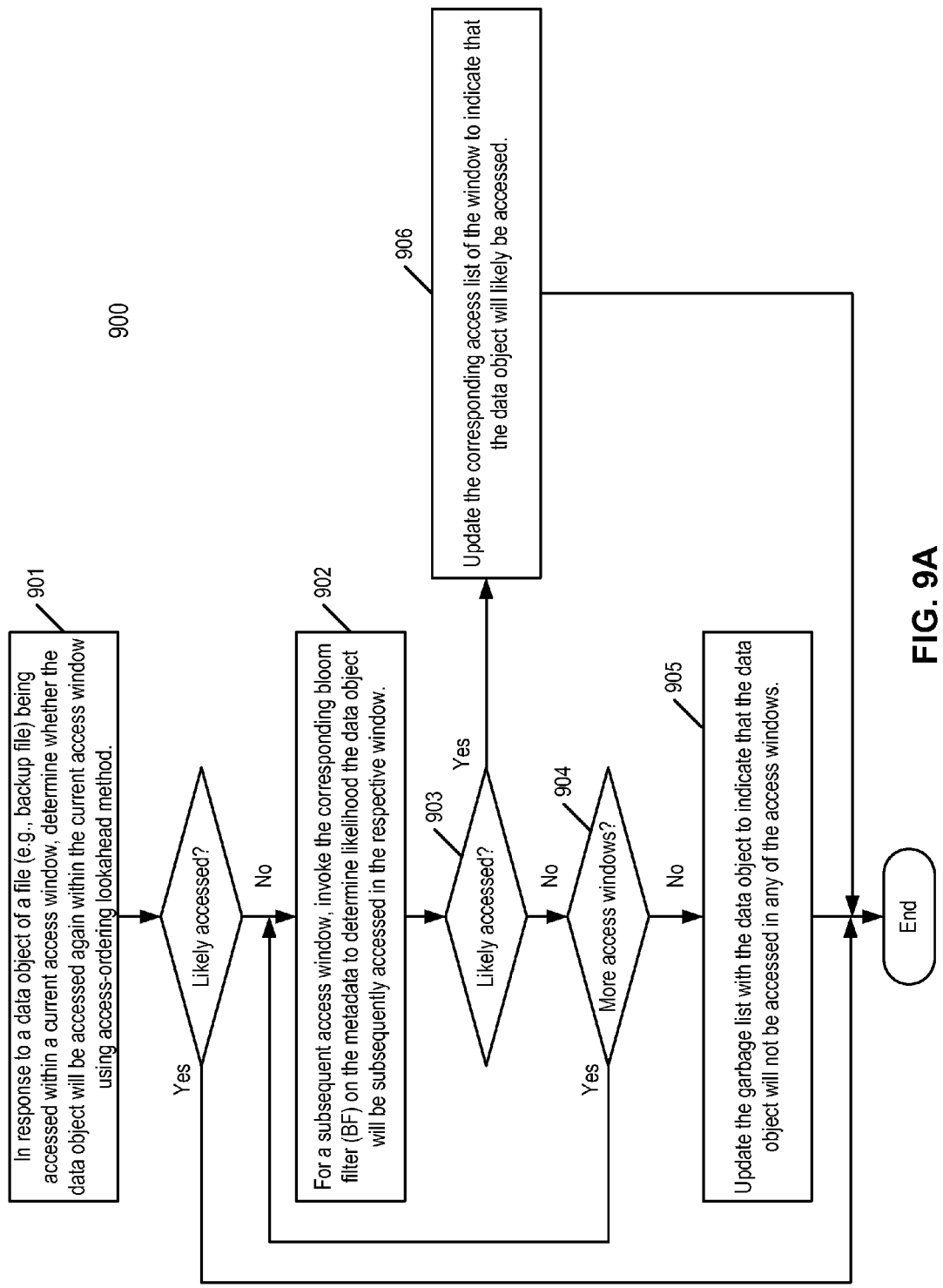
FIG. 9A is a flow diagram illustrating a bloom filter lookahead method according to one embodiment of the invention.

FIG. 9A is a flow diagram illustrating a bloom filter lookahead method according to one embodiment of the invention. Method 900 may be performed by system 700 as shown in FIGS. 7A and 7B, which may be performed by processing logic in software, hardware, or a combination thereof. Referring to FIG. 9A, in response to a request for accessing a data object of a file (e.g., backup file) within a current access window, at block 901, processing logic determines whether the data object will be accessed again within the current access window, using the access-ordering lookahead method as described above. The current access window is the first overall access window of multiple access windows in a chain or sequence. If the data object will likely be accessed again within the current access window, the next access time or order of the data object is populated in the eviction candidate data structure and the process ends.

If it is determined that the data object will likely not be accessed again in the current access window, at block 902, for a subsequent access window in the chain, processing logic invokes a bloom filter lookahead method to apply the corresponding bloom filter on metadata (e.g., fingerprint) of the data object to estimate the likelihood that the data object will be accessed during a logical timeframe associated with the respective access window. At block 903, if it is estimated that the data object is likely to be accessed during a logical access timeframe of the access window, at block 906, an access list of the corresponding access window is populated and the process ends. If it is estimated that the data object is unlikely to be accessed within the respective access window, at block 904, it is determined whether there are more access windows in the chain. If so, a next access window in the chain is identified and the above process is iteratively performed. Otherwise, at block 905, the data object is populated in a garbage list to indicate that the data object is unlikely to be accessed during any of the access windows in the chain.

Figure 9B:
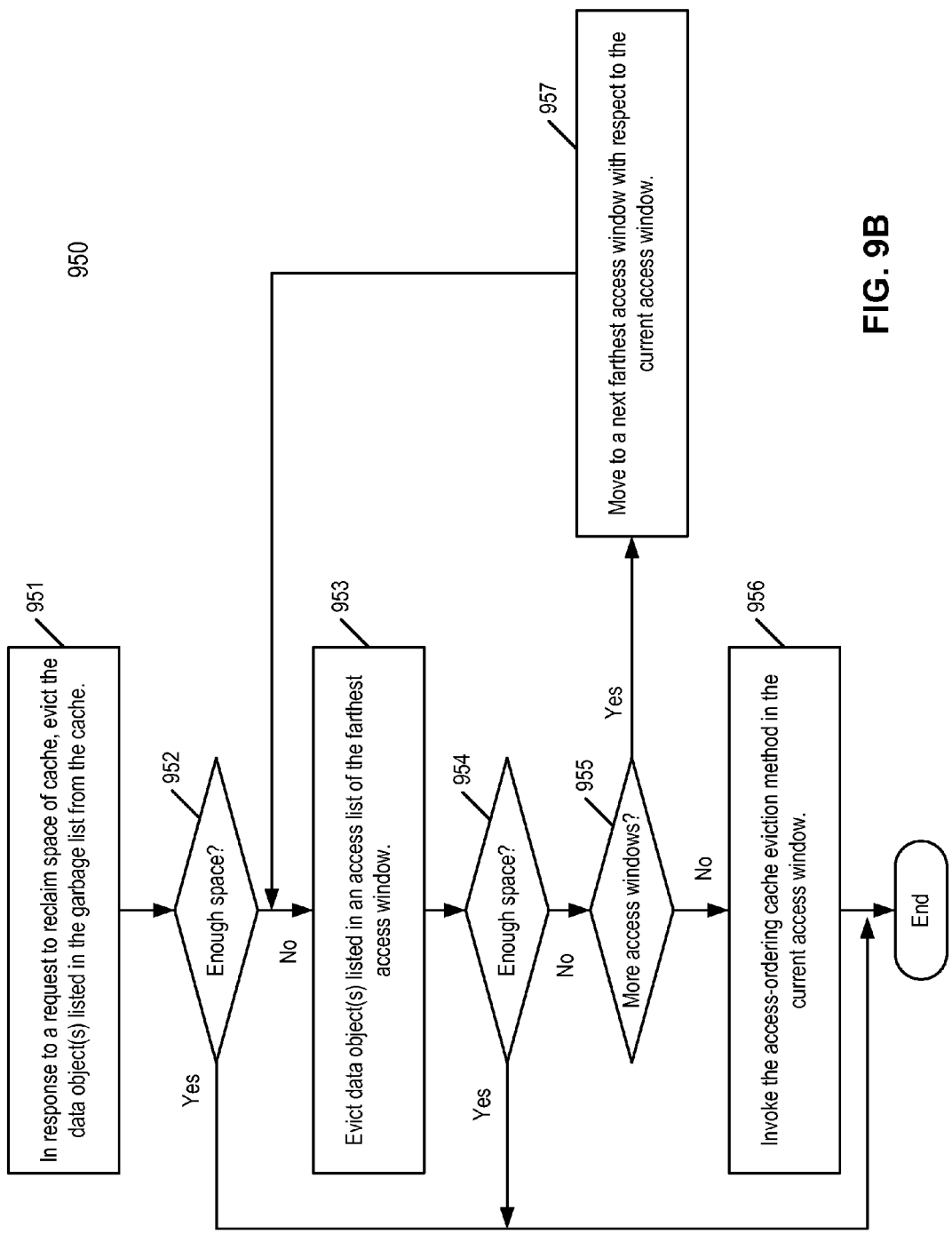
FIG. 9B is a flow diagram illustrating a bloom filter lookahead method according to another embodiment of the invention.

FIG. 9B is a flow diagram illustrating a bloom filter lookahead method according to another embodiment of the invention. Method 950 may be performed by system 700 as shown in FIGS. 7A and 7B, which may be performed by processing logic in software, hardware, or a combination thereof. Referring to FIG. 9B, at block 951, in response to a request to reclaim cache space, processing logic evicts one or more data object list in the garbage list. At block 952, it is determined whether there is enough cache space. If so, the process ends; otherwise, at block 953, data objects listed in the access list of the farthest access window will be evicted from the cache. At block 954, it is determined whether there is enough cache space. If so, the process ends; otherwise, at block 955, it is determined whether there are more access windows to be processed. If so, a next farthest access window (with respect to the current access window) is identified at block 957 and the above process is iteratively performed. If there is no more access window to be processed, at block 956, the eviction candidates of the current access window produced by the access-ordering lookahead method are evicted from the cache.

Figure 10:
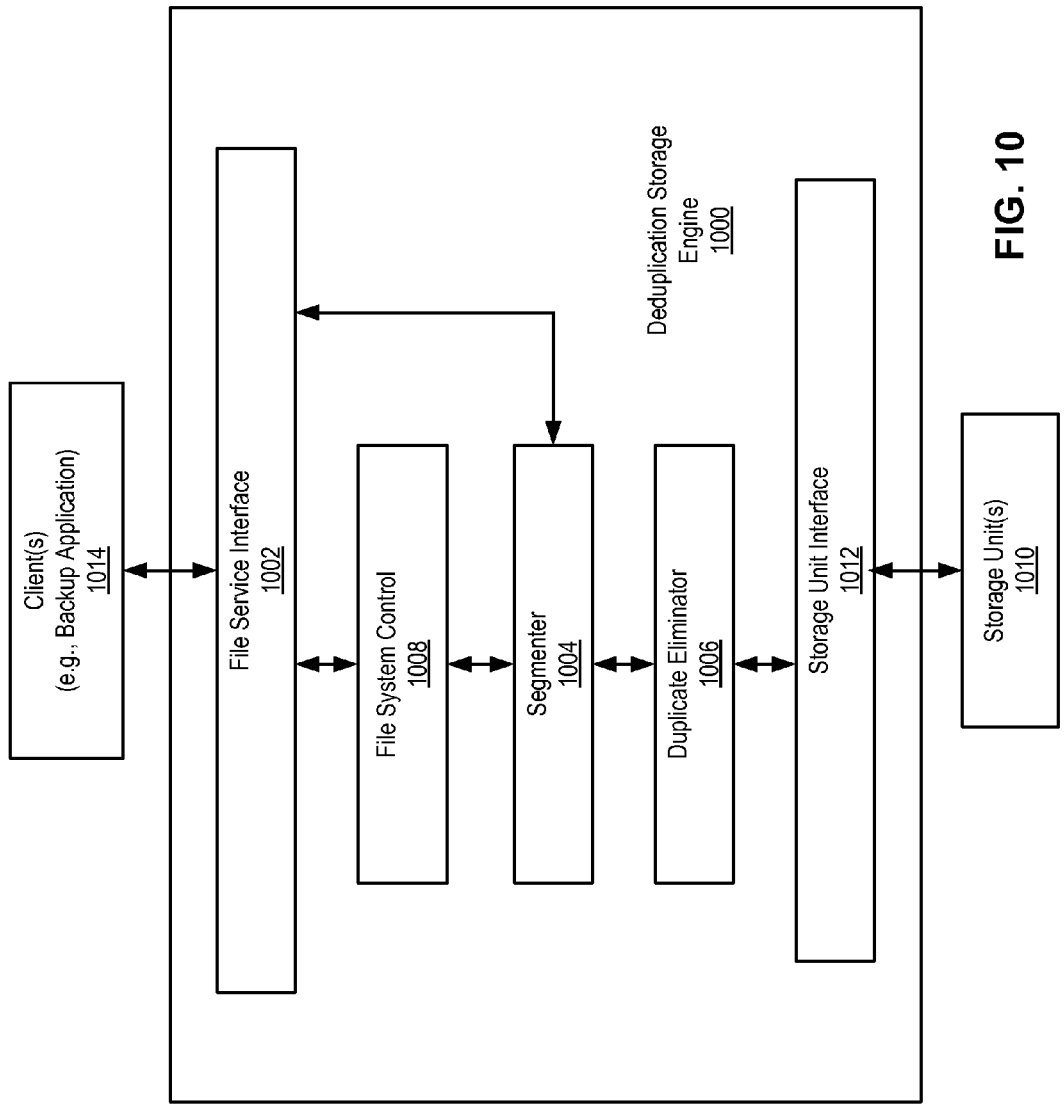
FIG. 10 is a block diagram illustrating a deduplicated storage system according to one embodiment of the invention.

FIG. 10 is a block diagram illustrating a chunk storage engine according to one embodiment of the invention. For example, deduplication storage engine 1000 may be implemented as part of a deduplication storage system as described above, such as deduplication storage engine 107 of FIG. 1. Referring to FIG. 10, in one embodiment, deduplication storage engine 1000 includes file service interface 1002, segmenter 1004, duplicate eliminator 1006, file system control 1008, and storage unit interface 1012. Deduplication storage engine 1000 receives a file or files (or data item(s)) via file service interface 1002, which may be part of a file system namespace of a file system associated with the deduplication storage engine 1000. The file system namespace refers to the way files are identified and organized in the system. An example is to organize the files hierarchically into directories or folders. File service interface 1012 supports a variety of protocols, including a network file system (NFS), a common Internet file system (CIFS), and a virtual tape library interface (VTL), etc.

The file(s) is/are processed by segmenter 1004 and file system control 1008. Segmenter 1004 breaks the file(s) into variable-length chunks based on a variety of rules or considerations. For example, the file(s) may be broken into chunks by identifying chunk boundaries using a content-based technique (e.g., a function is calculated at various locations of a file, when the function is equal to a value or when the value is a minimum, a maximum, or other value relative to other function values calculated for the file), a non-content-based technique (e.g., based on size of the chunk), or any other appropriate technique. In one embodiment, a chunk is restricted to a minimum and/or maximum length, to a minimum or maximum number of chunks per file, or any other appropriate limitation.

In one embodiment, file system control 1008 processes information to indicate the chunk(s) association with a file. In some embodiments, a list of fingerprints is used to indicate chunk(s) associated with a file. File system control 1008 passes chunk association information (e.g., representative data such as a fingerprint) to an index (not shown). The index is used to locate stored chunks in storage units 1010 via storage unit interface 1012. Duplicate eliminator 1006 identifies whether a newly received chunk has already been stored in storage units 1010. In the event that a chunk has already been stored in storage unit(s), a reference to the previously stored chunk is stored, for example, in a chunk tree associated with the file, instead of storing the newly received chunk. A chunk tree of a file may include one or more nodes and each node represents or references one of the deduplicated chunks stored in storage units 1010 that make up the file. Chunks are then packed by a container manager (not shown) into one or more storage containers stored in storage units 1010. The deduplicated chunks may be further compressed using a variation of compression algorithms, such as a Lempel-Ziv algorithm before being stored.

When a file is to be retrieved, file service interface 1002 is configured to communicate with file system control 1008 to identify appropriate chunks stored in storage units 1010 via storage unit interface 1012. Storage unit interface 1012 may be implemented as part of a container manager. File system control 1008 communicates with an index (not shown) to locate appropriate chunks stored in storage units via storage unit interface 1012. Appropriate chunks are retrieved from the associated containers via the container manager and are used to construct the requested file. The file is provided via interface 1002 in response to the request. In one embodiment, file system control 1008 utilizes a tree (e.g., a chunk tree) of content-based identifiers (e.g., fingerprints) to associate a file with data chunks and their locations in storage unit(s). In the event that a chunk associated with a given file or file changes, the content-based identifiers will change and the changes will ripple from the bottom to the top of the tree associated with the file efficiently since the appropriate content-based identifiers are easily identified using the tree structure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. A computer-implemented method for providing a storage system, the method comprising:
   receiving, by an access manager executed by a processor, a request from a client application to read a first portion of a file from a persistent storage device of the storage system, wherein the file references a plurality of deduplicated data segments stored in the storage system that are shared by a plurality of files;
   predicting, by an access predictor executed by the processor, future requests to the file based in part on the received request and metadata of the file, including determining whether any deduplicated segment referenced by the first portion will likely be accessed subsequently in a second portion of the file;
   optimizing access of a subsequent portion of the file based on the predicted future requests, including retaining a first deduplicated segment in a cache memory device in response to determining that the first deduplicated segment will be accessed subsequently in the second portion of the file; and
   returning data contained in the first portion of the file to the client application, wherein the data is constructed based on deduplicated segments retrieved from the cache memory device and the persistent storage device.

2. The method of claim 1, wherein the storage system is a deduplicating storage system.

3. The method of claim 1, wherein optimizing the storage system includes managing a data cache based on the predicted future requests.

4. The method of claim 1, wherein optimizing access of the subsequent portion of the file includes prefetching data into a data cache based on the predicted future requests.

5. The method of claim 1, wherein optimizing access of the subsequent portion of the file includes scheduling an order in which requests are handled based on the predicted future requests.

6. The method of claim 1, wherein predicting future requests is based in part on the type of file.

7. The method of claim 6, wherein if the file contains a backup image, predicting future requests includes predicting that the file will be read sequentially from beginning to end.

8. The method of claim 1, further comprising receiving from a software program an indication of a task and predicting future requests based on the received task.

9. The method of claim 8, wherein the software program is a backup software and the task is to restore from backup, and predicting future requests includes predicting that the file will be read sequentially from beginning to end.

10. The method of claim 8, wherein the software program is antivirus software and the task is to scan for viruses, and predicting future requests includes predicting that the file will be read sequentially from beginning to end.

11. A non-transitory computer-readable storage medium having instructions stored therein, which when executed by a processor, cause the processor to perform a method for providing a storage system, the method comprising:
    receiving a request from a client application to read a first portion of a file from a persistent storage device of the storage system, wherein the file references a plurality of deduplicated data segments stored in the storage system that are shared by a plurality of files;
    predicting future requests to the file based in part on the received request and metadata of the file, including determining whether any deduplicated segment referenced by the first portion will likely be accessed subsequently in a second portion of the file;
    optimizing access of a subsequent portion of the file based on the predicted future requests, including retaining a first deduplicated segment in a cache memory device in response to determining that the first deduplicated segment will be accessed subsequently in the second portion of the file; and
    returning data contained in the first portion of the file to the client application, wherein the data is constructed based n deduplicated segments retrieved from the cache memory device and the persistent storage device.

12. The non-transitory computer-readable storage medium of claim 11, wherein the storage system is a deduplicating storage system.

13. The non-transitory computer-readable storage medium of claim 11, wherein optimizing the storage system includes managing a data cache based on the predicted future requests.

14. The non-transitory computer-readable storage medium of claim 11, wherein optimizing access of the subsequent portion of the file includes prefetching data into a data cache based on the predicted future requests.

15. The non-transitory computer-readable storage medium of claim 11, wherein optimizing access of the subsequent portion of the file includes scheduling an order in which requests are handled based on the predicted future requests.

16. The non-transitory computer-readable storage medium of claim 11, wherein predicting future requests is based in part on the type of file.

17. The non-transitory computer-readable storage medium of claim 16, wherein if the file contains a backup image, predicting future requests includes predicting that the file will be read sequentially from beginning to end.

18. The non-transitory computer-readable storage medium of claim 11, wherein the method further comprises receiving from a software program an indication of a task and predicting future requests based on the received task.

19. The non-transitory computer-readable storage medium of claim 18, wherein the software program is a backup software and the task is to restore from backup, and predicting future requests includes predicting that the file will be read sequentially from beginning to end.

20. The non-transitory computer-readable storage medium of claim 18, wherein the software program is antivirus software and the task is to scan for viruses, and predicting future requests includes predicting that the file will be read sequentially from beginning to end.

21. A storage system, comprising:
    a processor;
    an access manager coupled to the processor to receive a request from a client application to read a first portion of a file from a persistent storage device of the storage system, wherein the file references a plurality of deduplicated data segments stored in the storage system that are shared by a plurality of files; and an access predictor coupled to the access manager to predict future requests to the file based in part on the received request and metadata of the file, including determining whether any deduplicated segment referenced by the first portion will likely be accessed subsequently in a second portion of the file, wherein the access manager is configured to optimize access of a subsequent portion of the file based on the predicted future requests and to return data contained in the first portion of the file to the client application, wherein optimizing access includes retaining a first deduplicated segment in a cache memory device in response to determining that the first deduplicated segment will be accessed subsequently in the second portion of the file, and wherein the data is constructed based on the deduplicated segments retrieved from the cache memory device and the persistent storage device.

22. The system of claim 21, wherein the storage system is a deduplicating storage system.

23. The system of claim 21, wherein optimizing the storage system includes managing a data cache based on the predicted future requests.

24. The system of claim 21, wherein optimizing access of the subsequent portion of the file includes prefetching data into a data cache based on the predicted future requests.

* * * * *